(12) United States Patent
Morita et al.

(10) Patent No.: US 6,400,492 B1
(45) Date of Patent: Jun. 4, 2002

(54) ELECTROPHORETIC DISPLAY LIQUID, AND ELECTROPHORETIC DISPLAY MEDIUM, METHOD AND DEVICE USING THE LIQUID

(75) Inventors: Mitsunobu Morita, Numazu; Shigeyuki Harada; Kunio Hayakawa, both of Shizuoka-ken, all of (JP)

(73) Assignee: Ricoh Company Limited, Tokyo (JP)

(*) Notice: Subject to any disclaimer, the term of this patent is extended or adjusted under 35 U.S.C. 154(b) by 21 days.

(21) Appl. No.: 09/592,439

(22) Filed: Jun. 12, 2000

(30) Foreign Application Priority Data

Jun. 11, 1999 (JP) .................................. 11-165518
May 15, 2000 (JP) .................................. 12-141562

(51) Int. Cl.[7] .................. G02B 26/00; G03G 17/04; G09G 3/34
(52) U.S. Cl. .................. 359/296; 345/107; 430/35; 430/38; 430/19; 204/477; 204/622
(58) Field of Search .................. 359/296, 253, 359/265, 452; 345/107, 105; 430/19, 35, 38, 60; 204/622, 477, 478

(56) References Cited

U.S. PATENT DOCUMENTS

| | | | | |
|---|---|---|---|---|
| 3,668,106 A | * | 6/1972 | Ota .............................. | 359/296 |
| 3,756,693 A | * | 9/1973 | Ota .............................. | 345/107 |
| 3,767,392 A | * | 10/1973 | Ota .............................. | 430/35 |
| 3,870,517 A | * | 3/1975 | Ota et al. ..................... | 430/38 |
| 3,892,568 A | * | 7/1975 | Ota .............................. | 430/19 |

* cited by examiner

*Primary Examiner*—Loha Ben
(74) *Attorney, Agent, or Firm*—Oblon, Spivak, McClelland, Maier & Neustadt, P.C.

(57) ABSTRACT

An electrophoretic display liquid including a dispersion medium, a first granular material having one or more hollows therein and a color and a second granular material having a color different from the color of the first granular material. When an imagewise electric field is applied to the display liquid, the second granular material electrophoreses in a direction, resulting in formation of an image of the second granular material in the display liquid.

37 Claims, 11 Drawing Sheets

ELECTROPHORETIC DISPLAY LIQUID, AND ELECTROPHORETIC DISPLAY MEDIUM, METHOD AND DEVICE USING THE LIQUID

BACKGROUND OF THE INVENTION

1. Field of the Invention

The present invention relates to an electrophoretic display liquid, and more particularly to an electrophoretic display liquid including particles, which reversibly changes its optical properties by applying an electric field thereto. In addition, the present invention relates to an electrophoretic display medium, method and device using the electrophoretic display liquid.

2. Discussion of the Background

An electrophoretic display medium having a closed cell in which two substrates, at least one of which is transparent, face each other with one or more spacers therebetween and which includes a display liquid including a dispersion medium and color particles dispersed in the dispersion medium whose color is different from the color of the color particles is known. In the electrophoretic display device, images are formed on the transparent substrate by applying an imagewise electric field to the display medium.

As the dispersion medium, xylene, isoparaffin and the like liquid are known. As the colored particles, titanium dioxide and the like pigment particles are known. In addition, additives such as a dye which is used for increasing the contrast of a formed image, a dispersant (e.g., a surfactant) which is used for dispersing the particles in the dispersion medium, and a charge imparting agent which imparts a charge to the color particles, are added thereto if desired. When an electric field is applied to the cell including the display liquid, the color particles move toward the transparent substrate of the cell, and thereby the transparent substrate achieves the color of the color particles. When an opposite electric field is applied thereto, the colored particles move toward the substrate opposite to the transparent substrate, and thereby the transparent substrate achieves the color of the dispersion medium which is colored by a dye.

Recently such an electrophoretic display device attracts considerable attention because of having the following advantages:

(1) the display device can display an image by controlling only the direction of the electric field applied thereto;
(2) the display liquid can be prepared by materials which can be easily obtained and which have relatively low costs;
(3) the images formed in the display device have a field of view as wide as general printed documents (i.e., the image can be easily observed even at a point such that an angle formed by the point and the normal line of the display plane is large);
(4) the display device consumes relatively low electric power; and
(5) the image formed in the display device can be used as a memory (i.e., the image can be read even when application of an electric field to the display medium is stopped).

An electrophoretic display device in which microcapsules including a colored dispersion medium and color particles having a different color and dispersed in the dispersion medium are sandwiched by electrodes is disclosed in Japanese Laid-Open Patent Publication No. 1-86116 (i.e., Japanese Patent No. 2551783). Such a display device has advantages in that the device is simple, and uneven images due to maldistribution of the particles can be avoided. However, the device has a drawback in that contrast of images is poor because of using a colored dye solution and pigment particles which are dispersed in the colored dye solution.

As mentioned above, such an electrophoretic display device includes a display liquid typically including particles such as inorganic pigments having a high refractive index (e.g., titanium dioxide) dispersed in a colored dispersion medium which includes a dye. In such a display device, the formed images have poor contrast because the color of the pigment is displayed as a mixed color of the pigment and the dispersion medium including a dye. The reason of this problem is considered to be that the dye adsorbs the pigment and the dispersion medium including the dye penetrates between the pigment particles. Therefore, this problem cannot be avoided in such a display device. This problem prominently occurs in a display device using a white pigment. The display device therefore produces images whose background area has poor whiteness. This is a fatal drawback in such display media.

In attempting to solve this problem, the following methods have been disclosed:

(1) a dye which colors the dispersion medium but does not adsorb the pigment dispersed in a display liquid is used (described by Philips Lab. in Conference Record of 1980 Biennial Disp. Res. Conf.);
(2) a dispersion medium including a dye at a relatively low concentration is used (described by Xerox PaloAlto in Proc. SID, Vol. 18, 3/4, 1977); and
(3) the dye concentration, and pigment concentration are optimized while a suitable surfactant is used (described by Matsushita Electric Works, Ltd. in Proc. SID, Vol. 18, No. 3/4, 1977).

However, these methods induce other problems in that the density of images decreases and response of the device deteriorates as well as it is hardly effective for improving image contrast.

In attempting to solve the above-mentioned problems of the display device including a dispersion medium including a dye, display devices which do not use a dye solution have been proposed. For example, Japanese Laid-Open Patent Publication No. 62-269124 discloses an electrophoretic display device having a closed cell which has two electrodes, at least one of which is transparent and which are opposed each other with a spacer therebetween. In the closed cell, at least two kinds of electrophoretic particles whose color and electrophoretic properties are different form each other are dispersed in a colorless liquid having a high insulation property and a low viscosity. Since these two kinds of color particles have charges having opposite polarities (i.e., one has a positive polarity and the other has a negative polarity), the particles tend to aggregate due to electric attraction. Therefore, a problem which occurs is that the resultant image has poor contrast because the image has a mixed color thereof.

In addition, WO98/03896 discloses a display device including a display liquid which is the same as that disclosed in Japanese Laid-Open Patent Publication No. 62-269124 and which is microencapsulated. However, the display device has the same drawback as that the image has poor contrast because the image has a mixed color of the two kinds of color particles.

In addition, Japanese Laid-Open Patent Publication No. 63-50886 discloses an electrophoretic display device having a closed cell which has two electrodes, at least one of which is transparent and which are opposed each other with a spacer therebetween. In the closed cell, at least two kinds of electrophoretic particles whose color and electrophoretic speed are different form each other are dispersed in a colorless liquid having a high insulation property and a low viscosity. Since these two kinds of color particles have charges having the same polarity but have different electrophoretic speed, it is difficult to control the color of images particularly when images are repeatedly formed. This is because it is hard to control exchanging of one kind of particles, which are present on the substrate of the cell as an image, with another kind of particles contained in the cell when the image displayed is changed. Therefore, such a display device also has a drawback in that images having good contrast cannot be obtained. In addition, it is difficult for the display device to display different colors at the same time and therefore it has poor practicality.

In attempting to solve the problem (i.e., formation of aggregates of different color particles) of the above-mentioned display device including two or more kinds of particles having different charge polarities, methods in which a charge controlling agent is added in the display liquid, or particles, which are subjected to a surface treatment so that the particles repulse the other kind of particles using steric repulsion effect, are used in the display liquid (Japanese Patent Publication Ko-hyo No. 8-510790). However, it is difficult to perfectly avoid aggregation of particles by such methods. Therefore, images having good contrast cannot be obtained by such methods.

In addition, Japanese Laid-Open Patent Publication No. 10-149117 discloses an ink composition including white particles which includes a resin and a white pigment and which is used for concealment purpose, colored particles and a solvent. The white particles are a complex of the resin and the white pigment and prepared by kneading a resin and a white pigment and then pulverizing the mixture. Alternatively, the particles are prepared by polymerizing a dispersion in which a monomer and a white pigment are mixed and then making aggregates of the polymerized particles. Namely, the complex white particles are almost the same as the white particles used as a colored pigment in the above-mentioned electrophoretic display device using a dyed dispersion medium and the colored pigment. Accordingly, the complex white particles also forms aggregates with the other pigment having a different color which is used for displaying images (for example, a magnetic powder, or a mixture color pigment thereof) because the white particles do not have a function reducing aggregates. Therefore, the problem in that images having poor contrast are produced has not yet be solved.

Because of these reasons, a need exists for an electrophoretic display device which can produce images having good contrast.

SUMMARY OF THE INVENTION

Accordingly, an object of the present invention is to provide an electrophoretic display liquid which can display images having high contrast.

Another object of the present invention is to provide an electrophoretic display medium which can display images having high contrast.

Yet another object of the present invention is to provide an electrophoretic display device which can display images having high contrast.

A further object of the present invention is to provide an electrophoretic displaying method, which can display images having high contrast.

Briefly these objects and other objects of the present invention as hereinafter will become more readily apparent can be attained by an electrophoretic display liquid in which a first granular material having one or more hollows therein (hereinafter referred to as hollow particles) and a second granular material (hereinafter referred to as pigment particles) whose color is different from the color of the first granular material are dispersed in a dispersion medium.

The hollow particles preferably include organic polymer particles having a hollow therein. In addition, the surface of the pigment particles is preferably treated with a coupling agent. The coupling agent preferably includes a titanate coupling agent.

The electrophoretic display liquid may be microencapsulated.

In another aspect of the present invention, an electrophoretic display medium is provided which includes a closed cell in which a pair of substrates are configured to face each other with one or more spacer therebetween and in which the above-mentioned display liquid is contained, wherein at least one of the pair of substrates includes an electrode at an inside surface thereof and at least one of the pair of substrates is transparent.

The cell may be divided into a plurality of cells with a matrix material. For example, the display liquid is dispersed in a matrix material such as a resin.

In addition, the display medium may include an information recording portion other than the electrophoretic display portion.

In yet another aspect of the present invention, an electrophoretic display device including the display medium, and an image writing device which can be attached with and detached from the display medium and which includes an electric field forming device applying an electric field to the display medium according to image signals to form images in the display medium. The electric field forming device is preferably an electrode array, an ion gun array, or a device having a plurality of signal electrodes, a plurality of scanning electrodes, and switching elements which are provided at the intersections of the signal electrodes and scanning electrodes.

In a further aspect of the present invention, an electrophoretic displaying method is provided which includes providing the electrophoretic display medium mentioned above, and applying an electric field in the display medium to form an image in the display medium by electrophoresis.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1A:
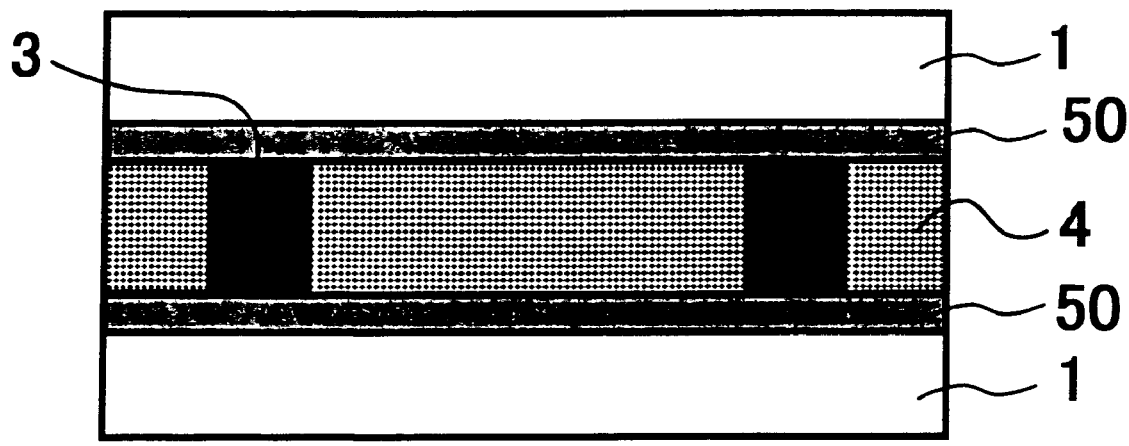
FIGS. 1A–1B, 2A–2D, 3A–3D, 4A–4D, 5A–5B, 6A–6B, 7, 8A and 8B are schematic diagrams illustrating cross sections of embodiments of the electrophoretic display medium of the present invention.

Generally, the present invention provides an electrophoretic display liquid in which hollow particles and pigment particles whose color is different from that of the first hollow particles are dispersed in a dispersion medium. The electrophoretic display medium of the present invention includes a closed cell in which a pair of substrates are configured to face each other with or without one or more spacer therebetween and in which the display liquid is contained, wherein at least one of the pair of substrates includes an electrode at the inside surface thereof and at least one of the pair of substrates is transparent. The display medium of the present invention can display images having high contrast.

The hollow particles for use in the display liquid are particles having one or more hollows (i.e., one or more air voids) in the particles. Namely, the hollow particles may be porous particles. In the display liquid, in which the hollow particles are dispersed in a dispersion medium, it is preferable that the hollows of the hollow particles are not penetrated by the dispersion medium. Namely, it is preferable that the hollows still exist when the hollow particles are dispersed in the dispersion medium.

Organic materials, inorganic materials and complexes of an organic material and an inorganic material, which have one or more hollows, can be used as the hollow particles. Suitable hollow particles include organic or inorganic hollow particles or porous particles. These particles may be covered with a resin. Among these particles, hollow particles made of an organic polymer material are preferable because of having good dispersibility in a dispersion medium. This is because organic polymer hollow particles have relatively low specific gravity compared to inorganic hollow particles.

These organic polymer hollow particles and porous particles can be prepared by one of known methods which are described in, for example, "Development of fine polymer particles" (by Toray Research Center), "Application of polymers having fine hollows (by Toray Research Center), and "Technique and application of fine polymer particles (by CMC).

Specifically, methods utilizing emulsion polymerization, seed emulsion polymerization, soap-free polymerization, or dispersion polymerization; combination methods of suspension polymerization with a foaming operation, seed polymerization with a foaming operation, or seed polymerization accompanied with polymerization shrinkage; methods utilizing suspension polymerization of a W/O/W emulsion; methods in which the surface of sprayed liquid drops is dried to form hollow particles; and seed aggregation methods in which electrolyte solid particles are added to a polymer emulsion to aggregate the particles of the emulsion. The manufacturing method of the hollow particles is not limited thereto.

Suitable materials for use as the polymer of the organic hollow particles or porous particles include known polymers. Specific examples of the materials include polymers and copolymers of styrene, styrene-acrylate, styrene-isoprene, divinyl benzene, methyl methacrylate, methacrylate, ethyl methacrylate, ethyl acrylate, n-butyl acrylate, acryl acid, acrylonitrile, acrylate-methacrylate, ethylene, ethylene-acrylic acid, nylon, silicone, urethane, melamine, benzoguanamine, phenol, fluorine containing compounds (e.g., tetrafluoroethylene), vinylidene chloride, quaternary pyridinium salt, synthetic rubbers, cellulose (e.g., acetyl cellulose), chitosan, calcium alginate, and the like compounds. The polymers constituting hollow particles preferably have good resistance to dispersion media used in the display liquid. These polymers may be crosslinked to improve their solvent resistance. The polymer of the hollow particles is not limited the materials mentioned above.

Specific examples of the hollow particles, which include such a polymer material mentioned above and which are manufactured by one of the above-mentioned methods, include hollow particles of a styrene-acrylate polymer tradenamed as Roapaque manufactured by Rohm and Haas, hollow particles of a crosslinked styrene-acrylic polymer manufactured by Japan Synthetic Rubber Co., Ltd., heat-expansible microcapsules manufactured by Matsumoto Yushi Seiyaku Co., Ltd., and hollow particles tradenamed as Grandoll manufactured by Dainippon Ink and Chemicals, Inc., but are not limited thereto. If hollow particles, which are dispersed in a liquid, are used in the display liquid, the hollow particles are added to the dispersion medium after being dried.

Complex particles in which one or more inorganic pigments are adhered to the surface of organic polymer hollow particles or porous polymer particles can also be used as the hollow particles. Specific examples of such complex particles include Ordered Mixture which is complex particles of organic polymer hollow particles and titanium dioxide.

The surface of the hollow particles may be reformed by, for example, a coating method (e.g., a Coatmizer Method of Freund Corp.) in which particles are coated with one or more compounds such as polymers, a surface treatment method using one or more coupling agents, and a polymerizing method in which one or more compounds are graft-polymerized with the particles.

The color of the hollow particles are not limited to white. The hollow particles may be dyed so as to have a desired color.

Inorganic hollow particles and porous particles also can be used as the hollow particles.

Suitable inorganic hollow particles and porous particles for use in the display liquid include known inorganic hollow particles and porous particles prepared by one of known methods such as methods utilizing adhesion (e.g., powder-bed methods, topo-chemical methods and mechanochemical reaction methods); methods utilizing deposition reaction (e.g., surface precipitation methods, impregnation methods, and interfacial reaction methods); and interfacial gelation reaction methods.

Specific examples of the inorganic hollow particles include silica, magnesium silicate, calcium silicate, strontium silicate, barium silicate, cobalt carbonate, cobalt oxide, cobalt, iron oxide, cobalt-iron carbonate, basic copper carbonate, copper, nickel carbonate and the like, which are manufactured by an interfacial reaction method (described in detail in a document "Challenge of designing new materials" published in Japan on May 29, 1998); and aluminum oxide, titanium dioxide, and the like manufactured by an interfacial gelation reaction method (described in detail in a Japanese magazine Shikizai 70(2)84–91, 1997). In addition, inorganic hollow particles which are prepared by calcining an inorganic material to make foams in the particles can also be used. Specific examples of such inorganic hollow particles include foam silica.

The surface of these inorganic hollow particles may be reformed by one of the known methods mentioned above. In addition, complex hollow particles of polymer particles or polymer hollow particles with inorganic hollow particles, and complex particles of a resin with inorganic hollow particles can also be used.

The particle diameter of hollow particles is preferably from about 0.01 to about 100 μm, and more preferably from about 0.1 to about 10 μm from the viewpoint of electrophoretic speed.

The hollow particles maintain air voids therein even when the hollow particles are dispersed in a dispersion medium of the display liquid. The materials of the hollow particles generally have relatively large refractive index compared to air. For example, methyl methacrylate resins, polystyrene, silicon dioxide and rutile-type titanium dioxide have refractive index of 1.49, 1.59–1.60, 1.53 and 2.90, respectively, which are larger than the refractive index of air, i.e., 1.0. These values of refractive index are described in Chemical Handbook published by Maruzen Co., Ltd. Since there is large difference in refractive index between the constituent of the hollow particles and the hollow (i.e., air voids), the hollow particles can effectively scatter light. Thus, the hollow particles have good hiding power even when the particles are present in a dispersion medium. Particles such as silicon dioxide and organic polymers, which have a relatively small refractive index, have poor hiding power in a dispersion medium if they have no hollows. Therefore, the particles cannot be used for this purpose. However, by making hollow or hollows in the particles, the particles can be used in the dispersion medium. Thus, various materials, which have not be used for this purpose by themselves, can be used by forming hollows therein.

In addition, the hollow particles have relatively small specific gravity compared to the pigment particles such as titanium dioxide having no voids. Therefore, the hollow particles tend not to precipitate in a dispersion medium. Namely, the hollow particles can maintain good dispersion state in a dispersion medium.

Suitable pigment particles having a color different from the color of the hollow particles for use in the display liquid include known colored or colorless (white) inorganic pigment particles and organic pigment particles. At this point, pigment particles means particles which can maintain a particle state in the dispersion medium used in the display liquid. Therefore, pigment particles which do not dissolve or hardly dissolve in the dispersion medium used are used in the display liquid.

Specific examples of inorganic pigment particles for use as the pigment particles in the display liquid include white lead, zinc white, lithopone, titanium dioxide, zinc sulfide, antimony oxide, calcium carbonate, kaolin, mica, barium sulfate, gloss white, alumina white, talc, silica, calcium silicate, cadmium yellow, cadmium lithopone yellow, yellow iron oxide, Titan Yellow, titan barium yellow, cadmium orange, cadmium lithopone orange, molybdate orange, iron oxide red, red lead, silver orange, cadmium red, cadmium lithopone red, umber, brown iron oxide, zinc iron chrome brown, chrome green, chromium oxide, viridian, cobalt green, cobalt chrome green, titan cobalt green, Prussian blue, cobalt blue, ultramarine blue, cerulean blue, cobalt aluminum chrome blue, cobalt violet, mineral violet, carbon black, iron black, manganese ferrite black, cobalt ferrite black, copper chrome black, copper chrome manganese black, black titanium oxide (titanium black), aluminum powder, copper powder, tin powder, zinc powder and the like.

Specific examples of the organic pigment particles for use as the pigment particles in the display liquid include Fast Yellow, disazo yellow, condensed azo yellow, anthrapyrimidine yellow, isoindoline yellow, copper azomethine yellow, quinophthaloin yellow, benzimidazolone yellow, nickel dioxime yellow, monoazo yellow lake, dinitroaniline orange, Pyrazolone Orange, perynone orange, Toluidine Red, Permanent Carmine, Brilliant Fast Scarlet, Pyrazolone Red, Rhodamine 6G Lake, Permanent Red, Lithol Red, BON Lake Red, Lake Red, Brilliant Carmine, Bordeaux 10B, Naphthol Red, Quinacridone Magenta, condensed Azo Red, Naphthol Carmine, perylene scarlet, condensed Azo Scarlet, benzimidazolone carmine, Anthraquinone Red, perylene red, perylene maroon, quinacridone maroon, quinacridone scarlet, quinacridone red, diketopyrrolopyrrole red, benzimidazolone brown, Phthalocyanine Green, Victoria Blue lake, Phthalocyanine Blue, Fast Sky Blue, Alkali Blue Toner, Indanthrene Blue, Rhodamine B Lake, Methyl Violet Lake, dioxazine violet, Naphthol Violet and the like.

Among these pigment particles, black titanium oxide (titan black) and titanium dioxide are preferably used. Black titanium oxide has a formula $Ti_nO_{2n-1}$ and is manufactured by partially deoxidizing titanium dioxide. In general, black titanium oxide is manufactured by calcining titanium dioxide and titanium in a vacuum condition. The titanium oxide having a formula $Ti_nO_{2n-1}$ has a color of from a dark color such as a bronze color, violet black or blue black to a gray color depending on the number of "n". By using such titanium oxides alone or in combination, various color pigment particles can be prepared.

The pigment particles preferably have a particle diameter of from about 0.01 to about 100 μm, and more preferably from about 0.1 to about 10 μm, to have good electrophoretic property.

The surface of these pigment particles may be reformed by one of the above-mentioned methods. Among the reforming methods, coupling treatments using a titanate or silane coupling agent are preferably used. In addition, complex pigment particles of polymer particles or polymer hollow particles with inorganic particles, and complex particles of a resin with inorganic particles can also be used. Further, the surface of these complex particles may be reformed.

By reforming the surface of the pigment particles with a coupling agent, the interaction between the pigment particles having a color different form the hollow particles and the hollow particles in the display liquid can be controlled. Suitable coupling agents for use in the surface reforming treatment include chromium coupling agents, silane coupling agents, titanate coupling agents, aluminum coupling agents, zirconium coupling agents, zircoaluminate coupling agents, fluorine-containing coupling agents, and the like.

Specific examples of such coupling agents include the following compounds but are not limited thereto.

Silane Coupling Agents 3-aminopropyl triethoxysilane, 3-aminopropyl methyldiethoxysilane, 3-ureidopropyl triethoxysilane, 3-ureidopropyl trimethoxysilane, 3-aminopropyl trimethoxysilane, 3-aminopropyl tris(2-methoxy-ethoxy-ethoxy)silane, N-methyl-3-aminopropyl trimethoxysilane, N-aminoethyl-3-aminopropyl-trimethoxysilane, diaminosilane, N-aminoethyl-3-aminopropyl methyldimethoxysilane, triaminopropyl-trimethoxysilane, 3-4,5-dihydroimidazolepropyl trimethoxysilane, 3-methacryloyloxypropyl trimethoxysilane, 3-glycidoxypropyl trimethoxysilane, 3-mercaptopropyl triethoxysilane, 3-mercaptopropyl trimethoxysilane, 3-mercaptopropyl methyldimethoxysilane, 3-chloropropyl triethoxysilane, 3-chloropropyl trimethoxysilane, 3-chloropropyl methyldimethoxysilane, 3-cyanopropyl triethoxysilane, vinyl trichlorosilane, vinyl triethoxysilane, vinyl trimethoxysilane, vinyl tri(2-methoxyethoxy)silane, hexamethylene disilazane, N,O-bis(trimethylsilyl) acetamide, methyltrimethoxysilane, methyltriethoxysilane, ethyltrichlorosilane, n-propyl trimethoxysilane, isobutyl trimethoxysilane, amyl trichlorosilane, octyl triethoxysilane, vinyl tris(β-methoxyethoxy)silane, γ-methacryloyloxypropyl trimethoxysilane, N-β-(aminoethyl)-γ-aminopropyl trimethoxysilane, γ-aminopropyl triethoxysilane, N-phenyl-γ-aminopropyl trimethoxysilane, phenyl trimethoxysilane, phenyl triethoxysilane, methyl tri(methacryloyloxyethoxy)silane, methyl tri(glycidyloxy)silane, long-chain-alkyl triethoxysilane, tetramethyl silicate, tetraethyl silicate, vinyl tris(2-methoxyethoxy)silane, 3-glycidoxypropyl methyldimethoxysilane, 2-(3,4-epoxycyclohexyl)ethyl trimethoxysilane, 3-methacryloyloxypropyl trimethoxysilane, γ-(2-aminoethyl)aminopropyl methyldimethoxysilane, N-β(N-vinylbenzylaminoethyl)-γ-aminopropyl trimethoxysilane hydrochloride, vinyl triacetoxysilane, γ-anilinopropyl trimethoxysilane, octadecyldimethyl[3-(trimethoxysilyl)propyl]ammonium chloride, γ-chloropropyl methyldichlorosilane, γ-methacryloyloxypropyl methyldimethoxysilane, trimethylmethoxysilane, trimethylethoxysilane, dimethyldimethoxysilane, dimethyldiethoxysilane, tetramethoxysilane, tetraethoxysilane, methyldimethoxysilane, methyldiethoxysilane, dimethylethoxysilane, dimethylvinylmethoxysilane, dimethylvinylethoxysilane, methylvinyldimethoxysilane, methylvinyldiethoxysilane, diphenyldiethoxysilane, diphenyldimethoxysilane, trimethylchlorosilane, dimethyldichlorosilane, methyltrichlorosilane, methyldichlorosilane, dimethylchlorosilane, dimethylvinylchlorosilane, methylvinyldichlorosilane, methylchlorodisilane, triphenylchlorosilane, methyldiphenylchlorosilane, diphenyldichlorosilane, methylphenyldichlorosilane, phenyltrichlorosilane, chloromethyldimethylchlorosilane, hexamethyldisilazane, cyclic silazane mixtures, N,N-bis(trimethylsilyl)urea, N-trimethylsilylacetamide, dimethyltrimethylsilylamine, diethyltrimethylsilylamine, trimethylsilylimidazole, N-trimethylsilylphenylurea, and the like compounds.

Titanate Coupling Agents isopropyltriisostearoyl titanate, isopropyltristearoyl titanate, isopropyltrioctanoyl titanate, isopropyldimethacrylisostearoyl titanate, isopropyltridodecylbenzenesulfonyl titanate, isopropylisostearoyldiacryl titanate, isopropyltri(dioctylphosphate) titanate, isopropyltricumylphenyl titanate, isopropyltris(dioctylpyrophosphate) titanate, isopropyltri(n-aminoethyl-aminoethyl) titanate, tetraisopropylbis(dioctylphosphite) titanate, tetraoctylbis (ditridecylphosphite) titanate, tetra(2,2 -diallyloxymethyl-1-butyl)bis(ditridecyl)phosphite tiranate, dicumylphenyloxyacetate titanate, bis(dioctylpyrophosphate)oxyacetate titanate, diisostearoylethylene titanate, bis(dioctylpyrophosphate)ethylene titanate, bis(dioctylpyrophosphate)diisopropyl titanate, tetramethyl orthotitanate, tetraethyl orthotitanate, tetrapropyl orthotitanate, tetraisopropyltetraethyl orthotitanate, tetrabutyl orthotitanate, butyl polytitanate, tetraisobutyl orthotitanate, 2-ethylhexyltitanate, stearyltitanate, cresyl titanate monomer, cresyl titanate polymer, diisopropoxy-bis-(2,4-pentadionate) titanium (IV), diisopropyl-bistriethanolamino titanate, octyleneglycol titanate, titanium lactate, acetoaceticester titanate, diisopropoxybis (acetylacetonato)titanium, di-n-buthoxybis (triethanolaluminato)titanium, dihydroxybis(lactato) titanium, titanium-isopropoxyoctyleneglycolate, tetra-n-butoxytitanium polymer, tri-n-butoxytitaniummonostearate polymer, butyltitanate dimer, titanium acetylacetonate, polytitanium acetylacetonate, titanium octyleneglycolate, titanium lactate ammonium salt, titanium lactate ethyl ester, titanium triethanolaluminate, polyhydroxytitaniumstearate, and the like compounds.

Aluminum Coupling Agents

Acetoalkoxyaluminum diisopropylate, and the like compounds.

Zirconium Coupling Agents

Zirconium butylate, zirconium acetylacetonate, acetylacetone zirconium butylate, zirconium lactate, stearic acid zirconium butylate, tetra(triethanolamine) zirconate, tetraisopropyl zirconate, and the like compounds.

Zircoaluminate Coupling Agents

Zircoaluminate type coupling agents tradenamed as A, C, C-1, F, M, M-1, S, APG, CPG, CPM, FPM, MPG, and MPM, and tetrapropyl zircoaluminate, and the like compounds.

Chrome Coupling Agents

Complexes of chromium methacrylate with chromium chloride, and the like compounds.

Fluorine-containing Coupling Agents

Trifluoropropyl trimethoxysilane, heptadecatrifluorodecyl trimethoxysilane, and the like compounds.

These coupling agents can be used alone or in combination. In addition, a plurality of surface treatments using different coupling agents can be performed step by step.

When pigment particles are treated with one or more of these coupling agents, the following known methods can be used:

(1) Direct Treating Methods in which Pigment Particles are Directly Treated with One or More Coupling Agents (a) dry methods;

(b) wet methods (such as slurry methods); and (c) spray methods.

(2) Integral Blend Methods in which Raw Materials of Pigment Particles are Treated with One or More Coupling Agents (a) direct methods;

(b) master batch methods; and (c) dry concentrate methods.

These methods are well known and described in the documents such as "New techniques of using coupling agents" by Science Technology General Laboratory, "Material design of new powder materials" by Technosystem Co. Ltd., and "Powder reforming techniques" by Chubu Software Laboratory. In addition, these methods are also described in, for example, Japanese magazine Shikizai 57[7] pp 363–372(1984), 59[11] pp 657–662, and 65[2] pp59–67; MATERIALS AND APPLICATIONS by PLASTICS AND RUBBER pp 117–121 (August 1978); Surface Science 3[2] pp 65–74; Rubber Digest 27[11] pp94–103; Polymer Digest [3] pp 23–32 (1982), and [5] pp 40–58; and Special Research Report by Agency of Industrial Science and Technology [23] pp281–292.

Among these methods, the direct treating methods in which mother pigment particles are directly treated with one or more coupling agents are preferably used. As mentioned above, the direct treating methods are classified into dry methods, wet methods, and spray methods.

The dry methods typically have the following steps:

(1) mother particles of pigment particles and a coupling agent are mixed in a dry condition (i.e., in a condition without using a liquid such as a solvent); and (2) the mixture is stirred at a high speed using a mixer such as a Henshel mixer or a super mixer while the mixture is heated, if desired.

The temperature of the heating step is controlled so that the coupling agent reacts with the particles.

The mother particles may be dried before being subjected to the treatment to improve the efficiency of the treatment.

The wet methods (slurry methods) typically have the following steps:
(1) mother particles of pigment particles and a coupling agent are mixed in a solvent such as water or organic solvents; and
(2) the mixture is stirred using a mixer while the mixture is heated, if desired.

In this case, the mother particles may be dried before being subjected to the treatment to improve the efficiency of the treatment. In addition, the mother particles may be previously pulverized and dispersed in the solvent with a mixer and the like to release the aggregates. By dispersing mother particles in the solvent such that there are no aggregates therein, the mother particles can be uniformly treated with the coupling agent. The mother particles may be dispersed in a solvent using a dispersing agent and or a surfactant.

The spray methods are such that one or more coupling agents are sprayed to mother particles using or without using a solvent.

Among the coupling agents mentioned above, the titanate coupling agents have relatively many functional groups, which can react with pigment particles, compared to other coupling agents such as silane coupling agents. Therefore, the titanate coupling agents can easily form a film on the surface of the pigment particles and consequently good reforming effects can be obtained. Accordingly, in the present invention, it is preferable to use one or more titanate coupling agents.

Suitable materials for use as the dispersion medium in the display liquid of the present invention include the following liquids:
(1) Aromatic Hydrocarbons Benzene and its derivatives such as benzene, toluene, xylene, ethylbenzene, and dodecylbenzene; diaryl alkanes and their derivatives such as phenylxylylethane, 1,1-ditolylethane, 1,2-ditolylethane, and 1,2-bis(3,4-dimethylphenylethane) (i.e., BDMF); alkylnaphthalenes and their derivatives such as diisopropylnaphthalene; alkylbiphenyls and their derivatives such as monoisopropylbiphenyl, isopropylbiphenyl, and isoamylbiphenyl; terphenyls and their derivatives which may be hydrogenated; triaryldimethanes and their derivatives such as dibenzyltoluene; benzylnaphthalene and its derivatives; phenyleneoxide and its derivatives; diarylalkylenes and their derivatives; arylindanes and their derivatives; polychlorinated biphenyls and their derivatives; and naphthenes.
(2) Aliphatic Hydrocarbons Paraffin such as hexane, cyclohexane, kerosene, and Isopars; and halogenated hydrocarbons such as chloroform, trichloroethylene, tetrachloroethylene, trifluoroethylene, tetrafluoroethylene, dichloromethane, chlorinated paraffins and ethyl bromide;
(3) Acid Esters Phosphoric acid esters such as tricresyl phosphate, trioctyl phosphate, octyldiphenyl phosphate, and tricyclohexyl phosphate; phthalic acid esters such as dibutyl phthalate, dioctyl phthalate, dilauryl phthalate, and dicyclohexyl phthalate; carbonic acid esters such as butyl oleate, diethyleneglycol dibenzoate, dioctyl sebacate, dibutyl sebacate, dioctyl adipate, trioctyl trimellitate, acetyltriethyl citrate, octyl maleate, dibutyl maleate, and ethyl acetate.
(4) Others N,N-dibutyl-2-butoxy-5-tert-octyl aniline.

These dispersion media can be used alone or in combination.

The dispersion medium may be colored by dissolving one or more oil soluble dyes therein.

Specific examples of such dyes are as follows but are not limited thereto:

Spirit Black (SB, SSBB, and AB), Nigrosine Base (SA, SAP, SAPL, EE, EEL, EX, EXBP and EB), Oil Yellow (105, 107, 129, 3G and GGS), Oil Orange (201, PS and PR), Fast Orange, Oil Red (5B, RR and OG), Oil Scarlet, Oil Pink 312, oil Violet #730, Macrolex Blue RR, Sumiplast Green G, Oil Brown (GR and 416), Sudan Black X60, Oil Green (502 and BG), Oil Blue (613, 2N and BOS), Oil Black (HBB, 860 and BS), Varifast Yellow (1101, 1105, 3108 and 4120), Varifast Orange (3209 and 3210), Varifast Red (1306, 1355, 2303, 3304, 3306 and 3320), Varifast Pink 2310N, Varifast Brown (2402 and 3405), Varifast Blue (3405, 1501, 1603, 1605, 1607, 2606 and 2610), Varifast Violet (1701 and 1702), Varifast Black (1802, 1807, 3804, 3810, 3820 and 3830) and the like.

In the display liquid, additives can be added, for example, to control the charge quantities of the hollow particles and the pigment particles and/or to improve the dispersibility of the hollow particles and the pigment particles. Suitable additives include known surfactants, and protective colloid agents, but are not limited thereto.

Suitable surfactants for use in the display liquid include anion surfactants, cation surfactants, amphoteric surfactants and nonionic surfactants. Specific examples of the surfactants are the following but are not limited thereto:
(1) Nonionic Surfactants polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxyethylene bisphenol A, polyoxyethylene nonylphenyl ether, polyoxyethylene octylphenyl ether, and nonylphenol ethoxylate;

polyoxyalkylene ethers such as polyoxyethylene caster oil, polyoxyalkylene block polymers, polyoxyethylene cetyl ether, polyoxyethylene lauryl ether, polyoxyethylene oleyl ether, polyoxyethylene stearyl ether, and polyoxypropylene ether;

glycols such as monool type polyoxyalkylene glycols, diol type polyoxyalkylene glycols, triol type polyoxyalkylene glycols, monool block type polyalkylene glycols, diol block type polyoxyalkylene glycols, and random type polyoxyalkylene glycols;

alkyl alcohol ethers such as primary linear alcohol ethoxylates (e.g., octylphenol ethoxylate, oleyl alcohol ethoxylate and lauryl alcohol ethoxylate), secondary linear alcohol ethoxylates, and polyphenol ethoxylates;

polyoxyalkylene alkyl esters such as polyoxyethylene rosin ester, polyoxyethylene lauryl ester, polyoxyethylene oleyl ester, and polyoxyethylene stearyl ester;

sorbitan esters of fatty acids such as sorbitan monolaurate, sorbitan monopalmitate, sorbitan monostearate, sorbitan dilaurate, sorbitan dipalmitate, sorbitan distearate, sesquilaurate, sorbitan sesquipalmitate, and sorbitan sesquistearate;

polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, and polyoxyethylene sorbitan sesquistearate;

fatty acid esters such as saturated fatty acid methyl esters, unsaturated fatty acid methyl esters, saturated fatty acid butyl esters, unsaturated fatty acid butyl esters, saturated fatty acid stearyl esters, unsaturated fatty acid stearyl esters, saturated fatty acid octyl esters, unsaturated fatty acid octyl esters, stearic acid polyethylene glycol esters, oleic acid polyethylene glycol esters, rosin polyethylene glycol esters;

fatty acid and their amides such as stearic acid, oleic acid, palmitic acid, lauric acid, and myristic acid, and their amides;

polyoxyethylene alkyl amines such as polyoxyethylene lauryl amine, and polyoxyethylene alkyl amine ethers;

higher fatty acid mono- or di-ethanol amides such as lauric acid monoethanol amide, and coconut fatty acid diethanol amide;

alkyl alkylol amides and alkanol amides such as polyoxyethylene stearic acid amide, and coconut diethanol amide (1-2 type or 1—1 type);

alkanol amines represented by one of the following formulae:

$$R\text{—}(CH_2CH_2O)_mH(CH_2CH_2O)_nH,$$

and $$R\text{—}NH\text{—}C_3H_6\text{—}NH_2$$

wherein R represents a group such as oleyl, octyl, dodecyl, tetradecyl, hexadecyl, octadecyl, coconut oil, tallow oil, soybean oil or the like;

primary amines represented by the following formula:

$$R\text{—}NH_2$$

wherein R represents a group such as oleyl, octyl, dodecyl, tetradecyl, hexadecyl, octadecyl, coconut oil, tallow oil, soybean oil or the like;

secondary amines represented by the following formula:

$$R1R2\text{-}NH$$

wherein R1 and R2 independently represent a group such as oleyl, octyl, dodecyl, tetradecyl, hexadecyl, octadecyl, coconut oil, tallow oil, soybean oil or the like;

tertiary amines represented by the following formula:

$$R1R2R3N$$

wherein R1, R2 and R3 independently represent a group such as oleyl, octyl, dodecyl, tetradecyl, hexadecyl, octadecyl, coconut oil, tallow oil, soybean oil or the like; and synthesized higher alcohols and natural higher alcohols;

polymers and oligomers such as acrylic polymers and oligomers, polycarboxylic acid compounds, and hydroxyfatty acid oligomers and their derivatives.

(2) Anionic Surfactants carboxylic acid salts such as polycarboxylic acid type polymer activators, polycarboxylic acid type nonionic activators, fatty acid soaps, and rosin soaps;

salts of sulfuric esters such as salts of sulfuric alcohol esters (e.g., salts of sulfuric caster oil ester, sodium salt of sulfuric lauryl alcohol ester, amine salts of sulfuric lauryl alcohol ester, sodium salts of sulfuric natural alcohol esters, and sodium salts of sulfuric higher alcohol esters), amine salts of sulfuric esters of lauryl alcohol ether, sodium salts of sulfuric esters of lauryl alcohol ether, amine salts of sulfuric esters of synthesized higher alcohol ethers, sodium salts of sulfuric esters of synthesized higher alcohol ethers, amine salts of sulfuric esters of alkylpolyethers, sodium salts of sulfuric esters of alkylpolyethers, amine salts of sulfuric esters of adducts of natural alcohols with ethylene oxide, sodium salts of sulfuric esters of adducts of natural alcohols with ethylene oxide, amine salts of sulfuric esters of adducts of synthetic alcohols with ethylene oxide, sodium salts of sulfuric esters of adducts of synthetic alcohols with ethylene oxide, amine salts of sulfuric esters of adducts of alkyl phenols with ethylene oxide, sodium salts of sulfuric esters of adducts of alkyl phenols with ethylene oxide, amine salts of sulfuric esters of polyoxyethylene nonylphenyl ether, sodium salts of sulfuric esters of polyoxyethylene nonylphenyl ether, amine salts of sulfuric esters of polyoxyethylene polyphenyl ether, and sodium salts of sulfuric esters of polyoxyethylene polyphenyl ether;

sulfonic acid salts such as amine salts of alkylarylsulfonic acids, sodium salts of alkylarylsulfonic acids, amine salts of naphthalenesulfonic acid, sodium salts of naphthalenesulfonic acid, amine salts of alkylbenzenesulfonic acids, sodium salts of alkylbenzenesulfonic acids, naphthalenesulfonic acid condensates and naphthalenesulfonic acid condensates of formalin;

sulfonic acid salts of polyoxyalkylenes such as amine salts of sulfonic acid of polyoxyethylene nonylphenyl ether, sodium salts of sulfonic acid of polyoxyethylene nonylphenyl ether, amine salts of sulfonic acid of polyoxyethylene aryl ethers, sodium salts of sulfonic acid of polyoxyethylene aryl ethers, amine salts of sulfonic acid of polyoxyethylene tridecylphenyl ether, sodium salts of sulfonic acid of polyoxyethylene tridecylphenyl ether, amine salts of sulfonic acid of polyoxyethylene alkyl ethers, and sodium salts of sulfonic acid of polyoxyethylene alkyl ethers;

salts of sulfosuccinic esters such as amine salts of dialkyl sulfosucinate, sodium salts of dialkyl sulfosucinate, amine salts of polyphenylpolyethoxy sulfosuccinate, sodium salts of polyphenylpolyethoxy sulfosuccinate, amine salts of sulfosuccinic monoesters of polyoxyethylene alkyl ethers, and sodium salts of sulfosuccinic monoesters of polyoxyethylene alkyl ethers; and phosphoric esters and salts such as alkyl phosphates, alkoxyalkyl phosphates, phosphoric esters of higher alcohols, phosphoric salts of higher alcohols, phosphoric esters of alkylphenols, phosphoric esters of aromatic compounds, phosphoric esters of polyoxyalkylene alkyl ethers, and phosphoric esters of polyoxyalkylene alkylaryl ethers.

(3) Cationic Surfactants quaternary ammonium salts of alkyltrimethyl amines represented by the following formula:

$$R\text{—}N(CH_3)_3X$$

wherein R represents a group such as stearyl, cetyl, lauryl, oleyl, dodecyl, coconut oil, soybean oil, tallow oil or the like, and X represents a halogen atom, an amino group or the like, quaternary ammonium salts of tetramethyl amines, and quaternary ammonium salts of tetrabutyl amines;

acetic acid salts represented by the following formula:

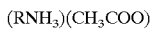

wherein R represents a group such as stearyl, cetyl, lauryl, oleyl, dodecyl, coconut oil, soybean oil, tallow oil or the like;

benzylamine type quaternary ammonium salts such as lauryldimethylbenzyl ammonium salts (halogenides or the like), stearyldimethylbenzyl ammonium salts (halogenides or the like), dodecyldimethylbenzyl ammonium salts (halogenides or the like); and polyoxyalkylene type quaternary ammonium salts represented by the following formula:

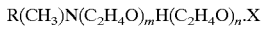

wherein R represents a group such as stearyl, cetyl, lauryl, oleyl, dodecyl, coconut oil, soybean oil, tallow oil or the like, and X represents a halogen atom, an amino group or the like.

(4) Amphoteric Surfactants betaine type surfactants, imidazoline type surfactants, β-alanine type surfactants, and hydrochloric salts of polyoctylpolyaminoethyl glycine.

Suitable protective colloid agents include known protective colloid agents which can be stably dissolved or dispersed in the dispersion medium used.

In the present invention, the display liquid may be microencapsulated. Microcapsules of display liquid can be prepared by any one of known methods such as in-situ methods, interfacial polymerization methods, coacervation methods and the like. Suitable materials for use as the shell of the microcapsules include polyurethane, polyurea, polyurea-polyurethane, urea-formaldehyde resins, melamine-formaldehyde resins, polyamides, polyesters, polysulfonamides, polycarbonates, polysulfinates, epoxy resins, polyacrylates, polymethacrylates, vinyl acetate, gelatin and the like. The particle diameter of the microcapsule for use in the present invention is preferably from about 0.5 μm to about 500 μm, and more preferably from about 1.0 μm to about 100 μm.

The display liquid may include one or more matrix materials. The matrix material is used for dividing the display liquid into a plurality of closed cells. Namely, the matrix material includes a display liquid and/or microcapsule particles of a display liquid therein.

Suitable materials for use as the matrix material include the materials mentioned above for use as the shell of the microcapsules. Specific examples of the matrix material are as follows:

polyethylene, polypropylene, polystyrene, polyvinyl chloride, polyvinylidene chloride, vinyl chloride-vinyl acetate copolymers, polyvinyl butyral, polyvinyl alcohol, polyethylene oxide, polypropylene oxide, ethylene-vinyl alcohol copolymers, polyacetal, acrylic resins, methyl cellulose, ethyl cellulose, phenolic resins, fluorine-containing resins, silicone resins, diene resins, polystyrene type thermoplastic elastomers, polyolefin type thermoplastic elastomers, polyurethane type thermoplastic elastomers, polyester type thermoplastic elastomers, polyphenylene ether, polyphenylene sulfide, polyether sulfone, polyether ketone, polyarylate, aramid, polyimide, poly-p-phenylene, poly-p-xylene, poly-p-phenylenevinylene, polyhydantoin, polyparabanic acid, polybenzimidazole, polybenzothiazole, polybenzooxadiazole, polyquinoxaline, and the like.

In addition, the following thermosetting resins and resins which can be crosslinked upon application of activating rays such as electron beam, X-ray, gamma-ray, ultraviolet light, and the like.

Thermosetting resins are polymers or polymerizable compounds having functional groups which react with themselves or a crosslinking agent upon application of heat to form covalent bonds, resulting in formation of a crosslinked structure. In general, the polymers or polymerizable compounds are used in combination with a crosslinking agent, a crosslinking promoter, and a catalyst.

Specific examples of such polymers or polymerizable compounds include polyvinylalkyl carbamate, polyvinyl butyral, polyvinyl acetal, polyvinyl alcohol, ethyl cellulose, acetyl cellulose, nitrocellulose, polyurea, polyurethane, urethane prepolymers, carboxyl-modified polyurethane, amino-modified polyurethane, polyurethane acrylate, polyester acrylate, epoxy acrylate, unsaturated polyester, polyether acrylate, N-methylolacrylamide, melamine, methylolmelamine, alkyd resins, phenolic resins, silicone resins, furan resins, resorcinol resins, and epoxy resins, and modified resins of these resins.

The crosslinking promoter and catalyst are selected from known crosslinking promoters and catalysts depending on the combination of the polymer (or polymerizable compound) and the crosslinking agent used.

Resins which can be crosslinked upon application of activating rays include one or more of photo-polymerizable monomers (i.e., reactive diluents), photo-polymerizable monomers, unsaturated prepolymers, unsaturated oligomers and the like. These polymerizable compounds are used together with one or more known photo initiators.

Specific examples of the photo-polymerizable monomers include monomers having one functional group such as 2-hydroxyethyl acrylate, 2-hydroxypropyl acrylate, 2-ethylhexyl acrylate, and 2-hydroxyethylacryloylphosphate; monomers having two functional groups such as 1,3-butanediol diacrylate, 1,4-butanediol diacrylate, 1,6-hexanediol diacrylate, diethyleneglycol diacrylate, tripropylene glycol diacrylate, neopentyl glycol diacrylate, polyethylene glycol diacrylate, and diacrylate of hydroxypivalic acid neopentyl glycol ester; and monomers having three or more functional groups such as dipentaerythritol, pentaerythritol triacrylate, and trimethylol propane triacrylate.

Specific examples of the photo-polymerizable oligomers include polyester acrylate, epoxy acrylate, polyurethane acrylate, polyether acrylate, silicone acrylate, alkyd acrylate, and melamine acrylate.

Specific examples of the photo initiators include benzophenone, methyl benzoylbenzoate, diethoxyacetophenone, 2-hydroxy-2-methyl-1-phenylpropane-1-one, 1-hydroxycyclohexylphenyl ketone, 2-methyl-1-{4-(methylthio)phenyl-2-}morphorinopropane-1, benzoin isobutyl ether, benzoin isopropyl ether, benzoin ethyl ether, benzil, benzyl methyl ketal, 2-chlorothioxanthone, and 2,4-diethylethioxanthone.

Specific examples of the unsaturated prepolymers and oligomers include unsaturated polyester, polyester acrylate, epoxy acrylate, polyurethane acrylate, polyether acrylate, unsaturated acrylic resins, unsaturated silicone, and unsaturated fluorine-containing resins.

In the present invention, the electrophoretic display liquid including a dispersion medium, hollow particles and pigment particles having a color different from the color of the hollow particles is provided. Both of the hollow particles and pigment particles are dispersed in the dispersion medium. In addition, electrophoretic display particles (hereinafter referred to as microcapsule particles) in which the display liquid is contained in microcapsule particles are also provided. Further, electrophoretic display medium and device using the display liquid and/or the microcapsule particles are also provided.

Figure 11A:
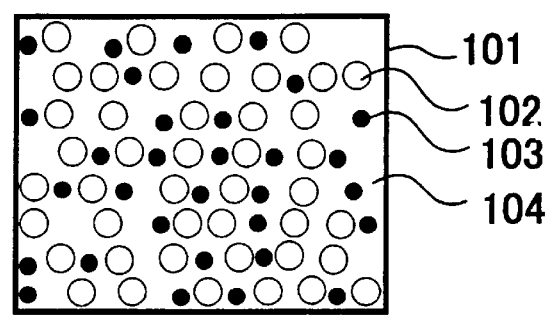
FIGS. 11A–11C are schematic diagrams explaining how an image is formed in the electrophoretic display medium of the present invention.
Figure 11B:
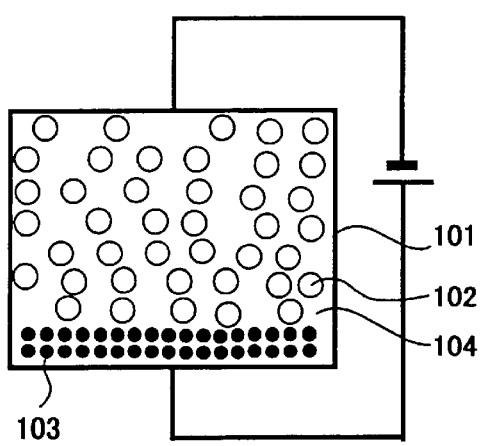
Figure 11C:
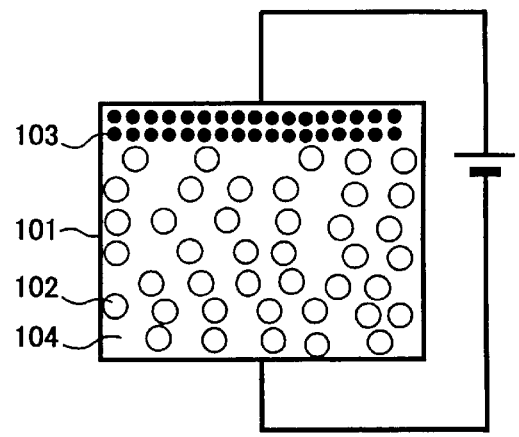

FIGS. 11A–11C are schematic diagrams explaining how an image is formed in the electrophoretic display medium of the present invention. In FIG. 11A, numeral 101, 102, 103 and 104 represent an electrophoretic display liquid, hollow particles, pigment particles having a color different from the color of the hollow particles, and a dispersion medium. When a voltage is applied to the display liquid, as shown in FIG. 11B, the pigment particles 103 are actively moved toward the negative electrode, i.e., the lower electrode, by electrophoresis. If a voltage is applied as shown in FIG. 11C, the pigment particles 103 are moved toward the upper electrode. In this case, it is supposed that the pigment particles 103 have a negative charge and the electrophoretic speed of the pigment particles 103 is faster than that of the hollow particles 102. Namely, by using hollow particles and pigment particles whose electrophoretic speeds are different, good images can be displayed.

The hollow particles 102 have a relatively small specific gravity compared to the pigment particles 103. Therefore, the hollow particles 102 are stably dispersed in the display liquid. When the pigment particles 103 are moved toward the lower electrode by electrophoresis and securely adhered thereon, or are precipitated on the lower electrode due to the difference in specific gravity between the pigment particles 103 and the dispersion medium 104, the display liquid displays the color of the hollow particles 102 (at this point, it is supposed that the image is observed from the upper electrode side). This state, in which the pigment particles are deposited on the electrode (or on the matrix materials or the inside surface of the microcapsule particles in the display device), is stably maintained.

When the pigment particles 103 are moved toward the upper electrode by electrophoresis, the pigment particles 103 are adhered on the electrode (or on the matrix materials or the inside surface of the microcapsule particles), or the pigment particles 103 form a layer in an upper part of the liquid, i.e., on the hollow particles 102 as shown in FIG. 11C. Therefore, the state is also maintained stably.

The concentration of the hollow particles 102 and the pigment particles 103 in the display liquid 101 is not particularly limited. However, the concentration of the hollow particles 102 in the display liquid 101 is preferably from 0.01 g to 8.0 g per 10 ml of the dispersion medium 104. The concentration of the pigment particles 103 is preferably from 0.01 to 8.0 g, and more preferably from 0.01 g to 4.0 g per 10 ml of the dispersion medium 104 from the viewpoint of the electrophoretic speed of the pigment particles 103. When the color of the hollow particles 102 is desired to be mainly displayed, the concentrations of the hollow particles 102 and the pigment particles 103 are preferably from 0.01 g to 4.0 g and 0.01 g to 1.0 g, respectively, per 10 milliliter of the dispersion medium 104. On the contrary, when the color of the pigment particles 103 is desired to be mainly displayed, the concentrations of the hollow particles 102 and the pigment particles 103 are preferably from 0.01 g to 1.0 g and 0.01 g to 4.0 g, respectively, per 10 milliliter of the dispersion medium 104.

Then the electrophoretic display medium and method of the present invention, which use the display liquid and the electrophoretic display particles mentioned above, will be explained in detail.

Figure 1B:
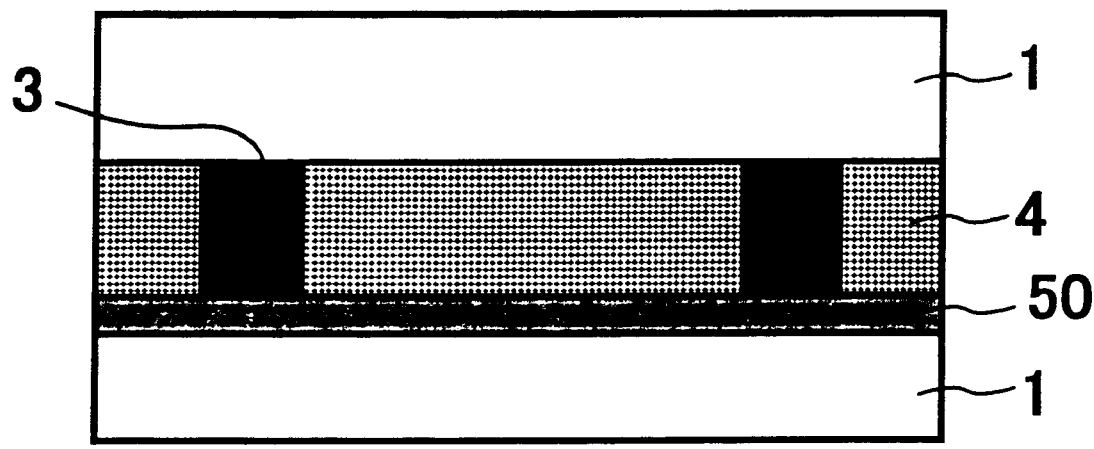
Figure 2A:
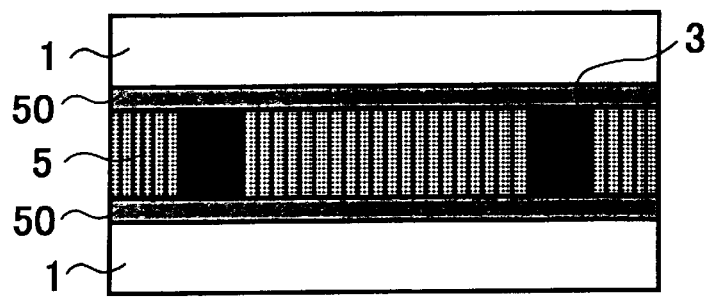
Figure 2B:
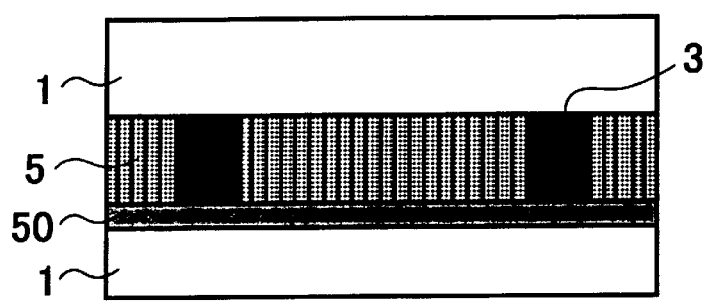
Figure 2C:
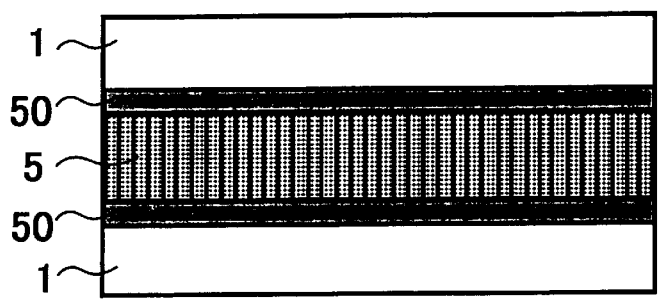
Figure 2D:
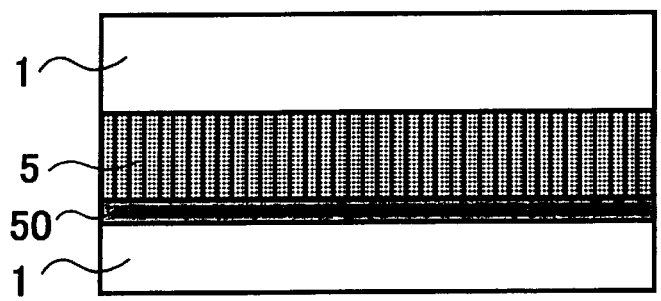

Specific examples of the electrophoretic display medium of the present invention include the following media, which are shown in FIGS. 1–6:

(1) Display Media as Shown in FIGS. 1A and 1B

The display media have a pair of substrates 1. At least one of the pair of substrates 1 has an electrode 50 on one side thereof. In addition, at least one of the pair of substrates 1 is transparent. The pair of substrates 1 is configured so as to face each other with one or more spacers 3 therebetween. Numeral 4 denotes a display cell (i.e., a recording layer) including the electrophoretic display liquid of the present invention.

(2) Display Media as Shown in FIGS. 2A–2D

The display media have a pair of substrates 1. At least one of the pair of substrates 1 has an electrode 50 on one side thereof. In addition, at least one of the pair of substrates 1 is transparent. The pair of substrates 1 is configured so as to face each other with or without one or more spacers 3 therebetween. A recording layer 5 includes one or more matrix materials by which the recording layer is divided into a plurality of closed cells. Namely, the display liquid is separated into plurality of domains in the matrix.

(3) Display Media as Shown in FIGS. 3A–3D

The display media have a pair of substrates 1. At least one of the pair of substrates 1 has an electrode 50 on one side thereof. In addition, at least one of the pair of substrates 1 is transparent. The pair of substrates 1 are configured so as to face each other with or without one or more spacers 3 therebetween. The display media include microcapsule particles 6 in a space (i.e., a cell) which is formed between the pair of substrates 1 with or without spacers 3. The microcapsule particles 6 include the display liquid of the present invention.

(4) Display Media as Shown in FIGS. 4A–4D

The display media have a pair of substrates 1. At least one of the pair of substrates 1 has an electrode 50 on one side thereof. In addition, at least one of the substrates 1 is transparent. The pair of substrates 1 is configured so as to face each other with or without one or more spacers 3 therebetween. The display media include a recording layer 7 which includes microcapsule particles and which is formed between the pair of substrates 1a and 1b with or without spacers 3. The recording layer 7 is divided into a plurality of closed cells by one or more matrix materials. Namely, the microcapsule particles are dispersed in the matrix.

Figure 5A:
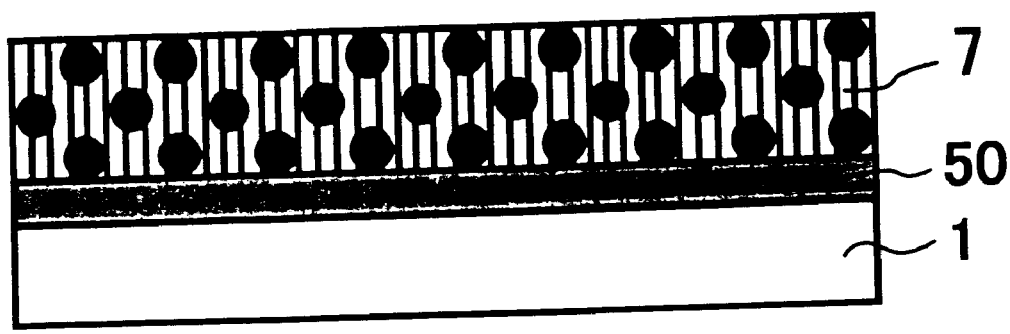
Figure 5B:
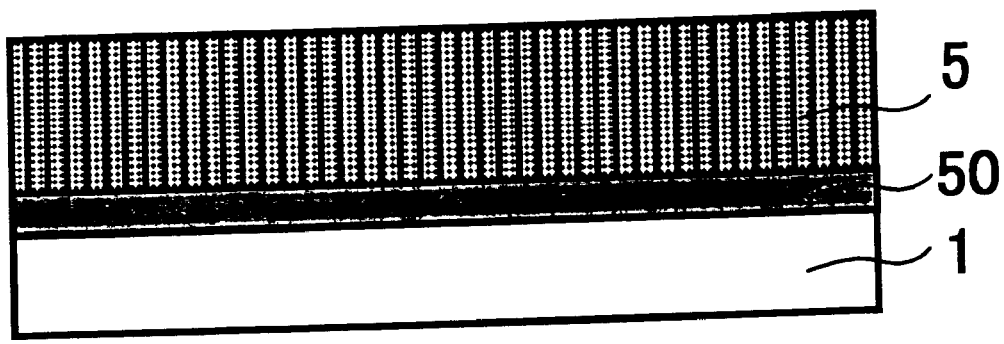

(5) Display Media as Shown in FIGS. 5A and 5B

The display media have a substrate 1 having an electrode 50 on one side of thereof. The substrate may be transparent or opaque. As shown in FIG. 5A, a layer 7 which includes microcapsule particles which is dispersed in a matrix material may be formed on the electrode 50 by coating. As shown in FIG. 5B, a layer 5 which includes a display liquid which is separated into a plurality of domains in a matrix material is formed on the electrode 50 by coating.

Figure 6A:
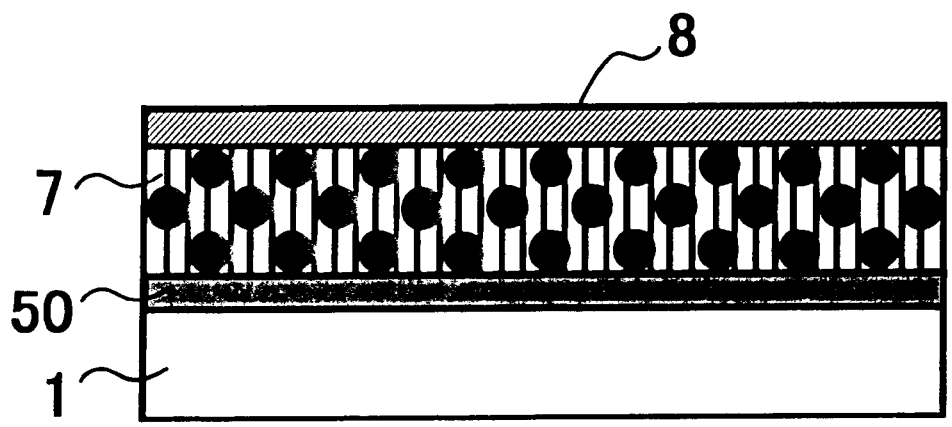
Figure 6B:
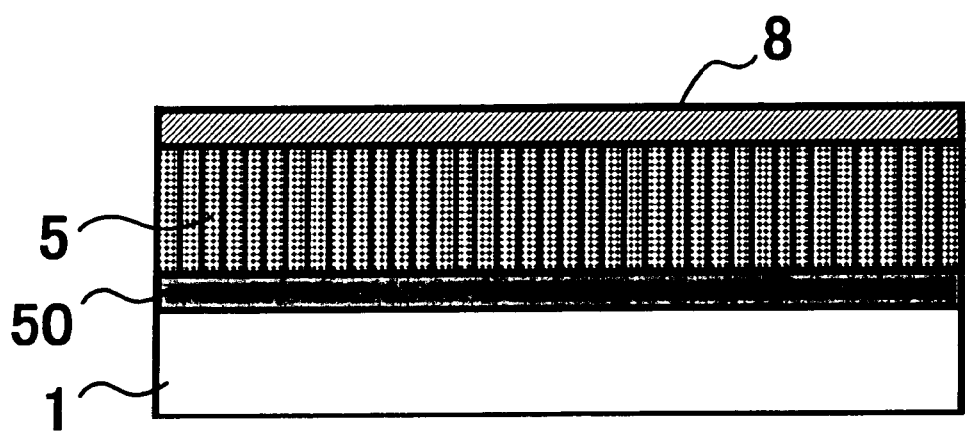

(6) Display Media as Shown in FIGS. 6A and 6B

The display media have a substrate 1 having an electrode 50 on one side of thereof. The substrate 1 may be transparent or opaque. As shown in FIG. 6A, a layer 7 which includes microcapsule particles which are dispersed in a matrix material may be formed on the electrode 50 by coating. As shown in FIG. 6B, a layer 5 which includes a display liquid which is dispersed in a matrix material is formed on the electrode 50 by coating. In addition, an overcoat layer 8 is formed on the layer 5 or the layer 7.

The structure of the display medium of the present invention is not limited thereto mentioned above.

The matrix materials and/or the overcoat layer 8 preferably include a resin crosslinked by heat and/or an activating ray such as electron beam, X-ray, gamma-ray, ultraviolet light, and the like.

The display medium of the present invention may have a print layer on at least one part thereof such as the substrates 1, or the overcoat layer 8. The print layer may be covered with a protective layer.

In addition, the display medium of the present invention may have an information storage material (device), to which information can be written and from which information can be read out, at a position other than the displaying area. The information storage material is preferably one of magnetic memories, integration circuit memories, photo-memories, and the like. Further, the information storage material includes information regarding the side information (i.e., the front side or the back side of the display medium) and/or information regarding a position in the display medium.

Next the display device of the present invention will be explained.

The display device includes the display medium of the present invention mentioned above and a writing device which can allow the display medium to display visible information. The writing device can be attached to and detached from the display medium. When it is desired that information is recorded in the display medium, the writing device applies an electric field to the display medium according to image signals. The writing device has an electrode array which can change its position relative to the display medium. Namely, the electrode array moves along the surface of the display medium. Visible images can be displayed in such a display device by applying a ground potential to the common electrode of the medium, and applying a voltage to the predetermined portion of the display medium with the electrode array while scanning the electrode array on the surface of the display medium, wherein the electrode array contacts the surface of the display medium.

The electrode array of the writing device may be substituted with an ion gun array which can supply charges on the surface of the display medium whose common electrode has a ground potential while changing its position relative to the display medium, wherein the ion gun array is set closely to the surface of the display medium. The thus formed charges on the display medium discharge with a time constant depending on the materials constituting the display medium. Therefore, the charging time can be shortened than the moving time (i.e., the response time) of the pigment particles (or hollow particles). When the discharging time of the charge formed on the display medium is longer than the moving time of the particles, the pigment particles move toward an electrode of the display device even if the charging is stopped. Therefore, the image writing time can be shortened and high speed recording is possible.

In the display device, visible images may be recorded in the display medium using a plurality of signal electrodes, a plurality of scanning electrodes, and switching elements which are provided at the intersections of the signal electrodes and the scanning electrodes. Namely, the switching elements apply electric fields to the display medium according to image information. Thus, visible images can be displayed in the display medium. The thus formed charges on the display medium discharge with the time constant depending on the materials constituting the display medium. Therefore, the charging time can be shortened than the moving time (i.e., the response time) of the pigment particles (or hollow particles). When the discharging time of the charge formed on the display medium is longer than the moving time of the particles, the pigment particles move toward an electrode of the display device even if the charging is stopped. Therefore, the image writing time can be shortened and high speed recording is possible.

The switching elements are preferably thin film transistors because a large area thin film device can be easily manufactured. Thin film transistors are three-terminal elements, and therefore have good switching properties. Accordingly, images including halftone images can be clearly displayed. In order to increase the writing speed, storage-type condensers may be provided as an equivalent circuit in parallel with the display medium.

The display medium of the present invention has a variety of uses. For example, the display medium can be used for a small card such as name cards, credit cards, point cards and member cards. By preparing a card in which the display medium is provided on the entire part or a part of the surface of the card, image information can be rewritten. In addition, by preparing the display medium having a large size, the display medium can be used as reversible image displaying media capable of substituting for the displays and recording sheets (e.g., copy paper), which are used in offices and the like. These reversible image displaying media are superior because they can be repeatedly used, resulting in material saving and energy saving.

In addition, the display medium can be used as a display device of electric products and the like. The display medium of the present invention has advantages over liquid crystal devices, which are typically used as a display medium of electric products. For example, the display medium has a relatively wide field of view, i.e., images displayed in the display medium can be observed even at a point such that an angle formed by the point and the normal line of the display plane is large. In addition, the display medium can display images having a relatively high image density compared to liquid crystal devices.

The display medium can be used as signboards and the like. Furthermore, the display medium can be used as a part of posters.

Thus, since the display medium of the present invention can have a good flexibility when plastic films and the like are used as the substrates, the display medium has a variety of uses.

The display medium of the present invention will be explained in detail referring to FIGS. 1–6.

The substrate 1 is typically a glass plate or a plastic plate, and may have an electrode 50 on one side thereof. The thickness of the substrate 1 is preferably from about 10 $\mu$m to about 5 mm, and more preferably from about 25 $\mu$m to about 200 $\mu$m. The electrode 50 may be an electrode patterned like a matrix. When the display medium has a structure as shown in FIGS. 1A–1B, 2A–2D, 3A–3D and 4A–4D, i.e., the display medium has a pair of substrates 1, at least one of the substrates 1 is transparent. On the transparent substrate, images are formed. The substrates 1 may be colored.

The substrates 1 of the display medium as shown in FIGS. 5 and 6 may be transparent or opaque, and may also be colored.

The electrode 50 is an electroconductive thin film made of a metal, ITO, $SnO_2$, ZnO:Al and the like. The electrode can be formed by a method such as sputtering methods, vacuum deposition methods, CVD methods and coating methods. When the electrode 50 is formed on the transparent substrate on which images are to be formed, the electrode 50 is needed to be transparent. In this case, the electrode 50 is made of a transparent material such as ITO, $SnO_2$, ZnO:Al and the like.

In the display media as shown in FIGS. 2A–2D and 5B, the recording layer 5 can be formed by coating a liquid, in which a display liquid is dispersed in a solution, dispersion, suspension or emulsion in which a matrix material is dissolved, dispersed, suspended or emulsified, on the electrode 50 and then drying the coated liquid. Suitable coating methods include wire bar coating, roll coating, blade coating, dip coating, spray coating, spin coating, gravure coating and the like coating methods. Alternatively, the recording layer 5 can be formed by a method in which at first a liquid, in which a matrix material is dissolved, dispersed, suspended or emulsified, is coated on the electrode 50 and then dried to form a matrix, and then the display liquid of the present invention is contained in the matrix.

Then the thus formed matrix is overlaid with another substrate 1.

Specific examples of the materials for use as the matrix are mentioned above.

Figure 3A:
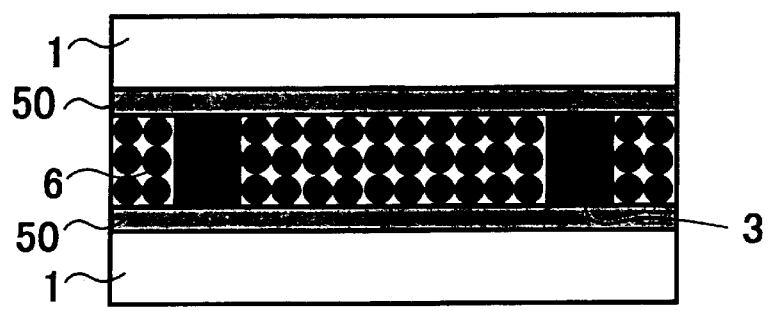
Figure 3B:
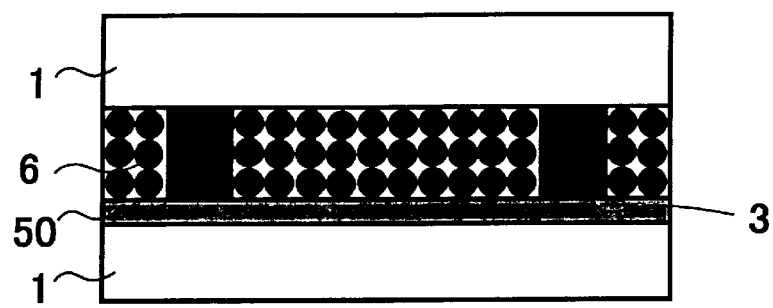
Figure 3C:
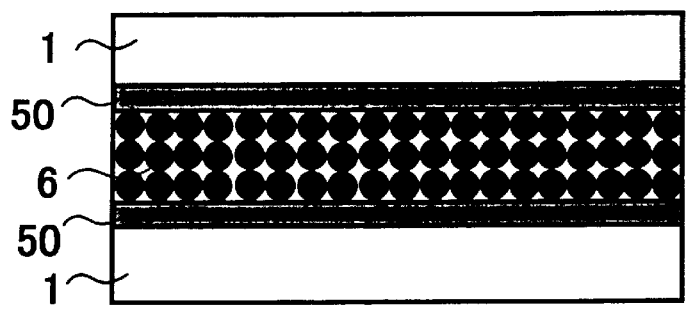
Figure 3D:
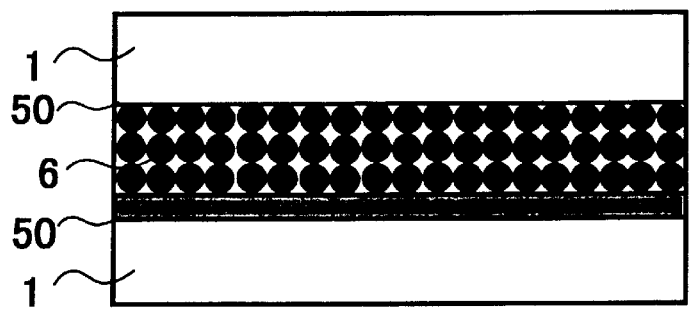
Figure 4A:
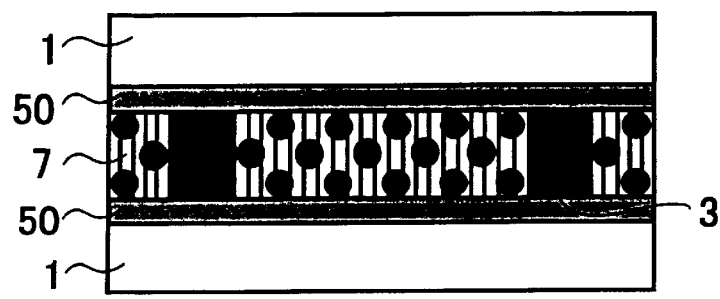
Figure 4B:
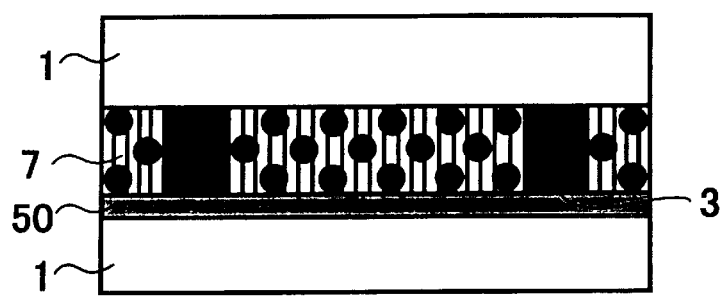
Figure 4C:
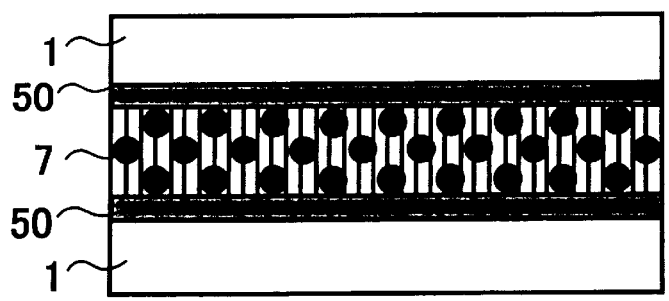
Figure 4D:
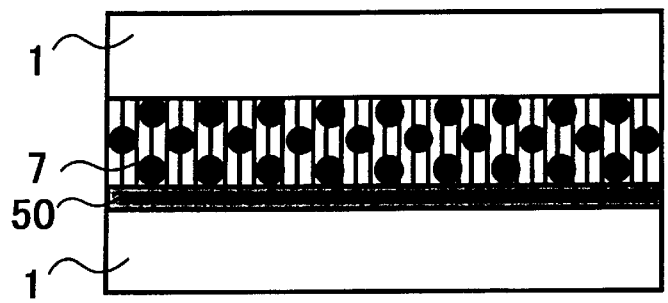

In the display medium as shown in FIGS. 3A and 3D, the microcapsule particles which include hollow particles, pigment particles having a color different from the color of the hollow particles, and a dispersion medium are contained in a cell formed by a pair of substrates optionally using one or more spacers therebetween.

In the display media as shown in FIGS. 4A–4D and 5A, the microcapsule particles, which include hollow particles, pigment particles having a color different from the color of the hollow particles, and a dispersion medium, are dispersed in a matrix. The recording layer 7 can be formed by one of the methods mentioned above.

In FIGS. 6A and 6B, the overcoat layer 8 is formed on the recording layer 7 or 5. Suitable materials for use in the overcoat layer 8 include the materials mentioned above for use in the matrix. The overcoat layer 8 is typically formed by coating on the recording layer a liquid which includes a solution, dispersion, suspension or emulsion, in which one or more of the materials mentioned above are dissolved, dispersed, suspended or emulsified in a medium, and additives such as crosslinking agents, catalysts and/or promoters. The overcoat layer 8 can be formed by one of the coating methods mentioned above, or a dry method such as sputtering methods, chemical vapor deposition (CVD) methods or the like. The overcoat layer 8 is preferably as thin as possible. The thickness thereof is preferably from about 0.1 $\mu$m to 100 $\mu$m, and more preferably from 0.3 $\mu$m to 30 $\mu$m.

Figure 7:
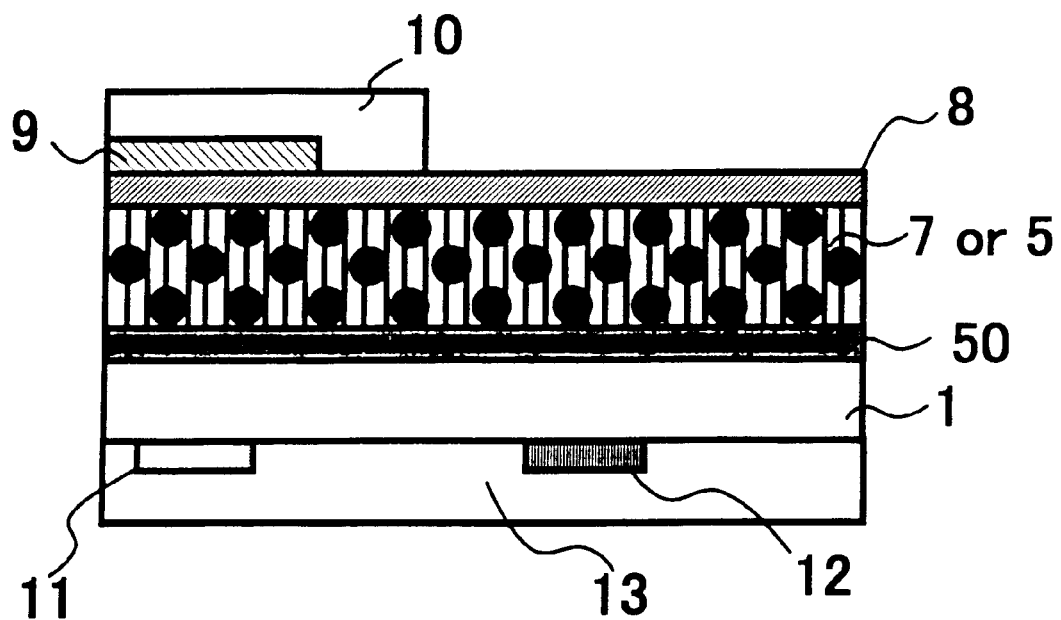

FIG. 7 is a schematic view illustrating another embodiment of the display medium of the present invention. The display medium has a substrate 1 having an electrode 50 thereon, a recording layer 7 (or a recording layer 5), and an overcoat layer 8, similarly to the medium as shown in FIG. 6A. A print layer 9 is formed on a part of the overcoat layer 8 by any known printing method. When images are formed on the overcoat side of the medium, the print layer 9 is formed at a portion other than the recording portion. A protective layer 10 is formed on the print layer 9 and the overcoat layer 8 by one of the known coating methods mentioned above and known printing methods. A magnetic recording portion 11, and an integrated circuit memory 12, which serve as information storage materials, are formed on a part of the opposite side of the display medium on which images are not displayed. The information storage material is not limited thereto, and photo memories and the like can also be used. A second protective layer 13 is formed on the magnetic recording portion 11 and the integrated circuit memory 12. The second protective layer 13 includes one or more of the materials mentioned above for use as the matrix.

Figure 8A:
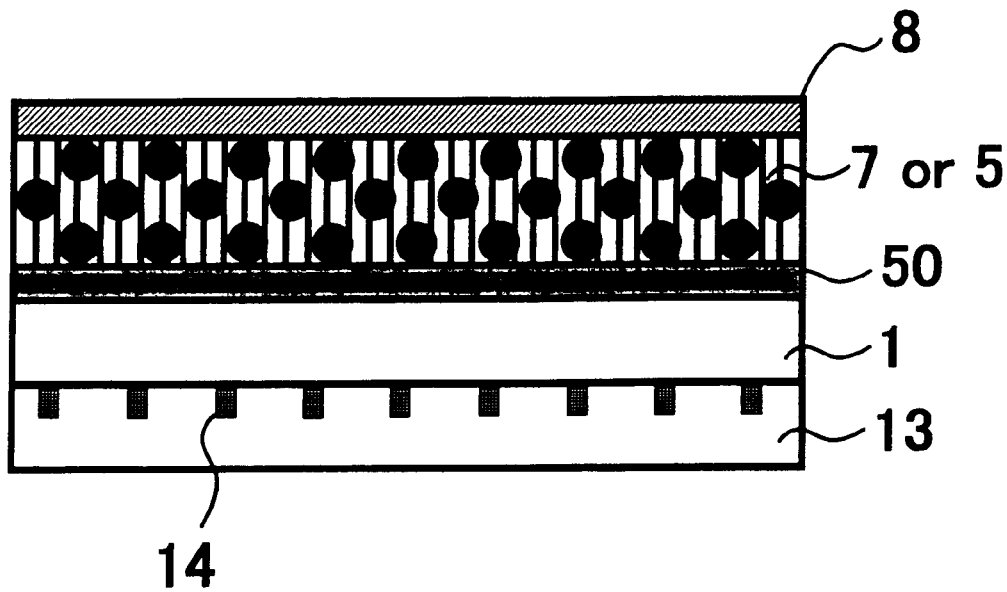
Figure 8B:
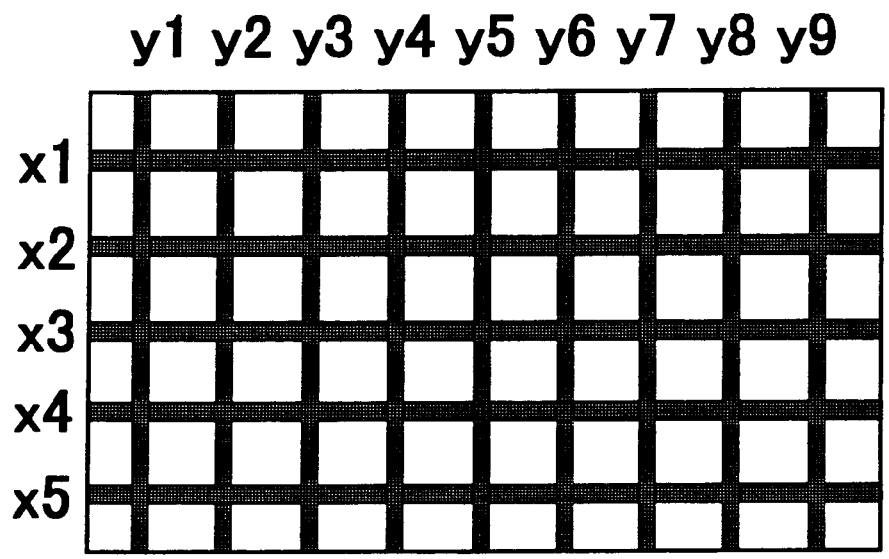

FIGS. 8A and 8B are schematic views illustrating yet another embodiment of the display medium of the present invention. The display medium has a substrate 1 having an electrode 50 thereon, a recording layer 7 (or a recording layer 5), and an overcoat layer 8, similarly to the medium as shown in FIG. 6A. A transparent information recording portion 14 is formed on the substrate 1. A second protective layer 13 is formed on the recording portion 14 and the substrate 1. The transparent information recording portion 14 is shaped as a lattice as shown in FIG. 8B. The lattice has a plurality of lines Xn and Ym. The position information of an intersection (Xn, Ym) can be used as digital information for a read-out purpose. In such a display medium, by using a transparent substrate 1 and a transparent electrode 50, images can be displayed either on the overcoat layer side or the transparent substrate side.

Figure 9:
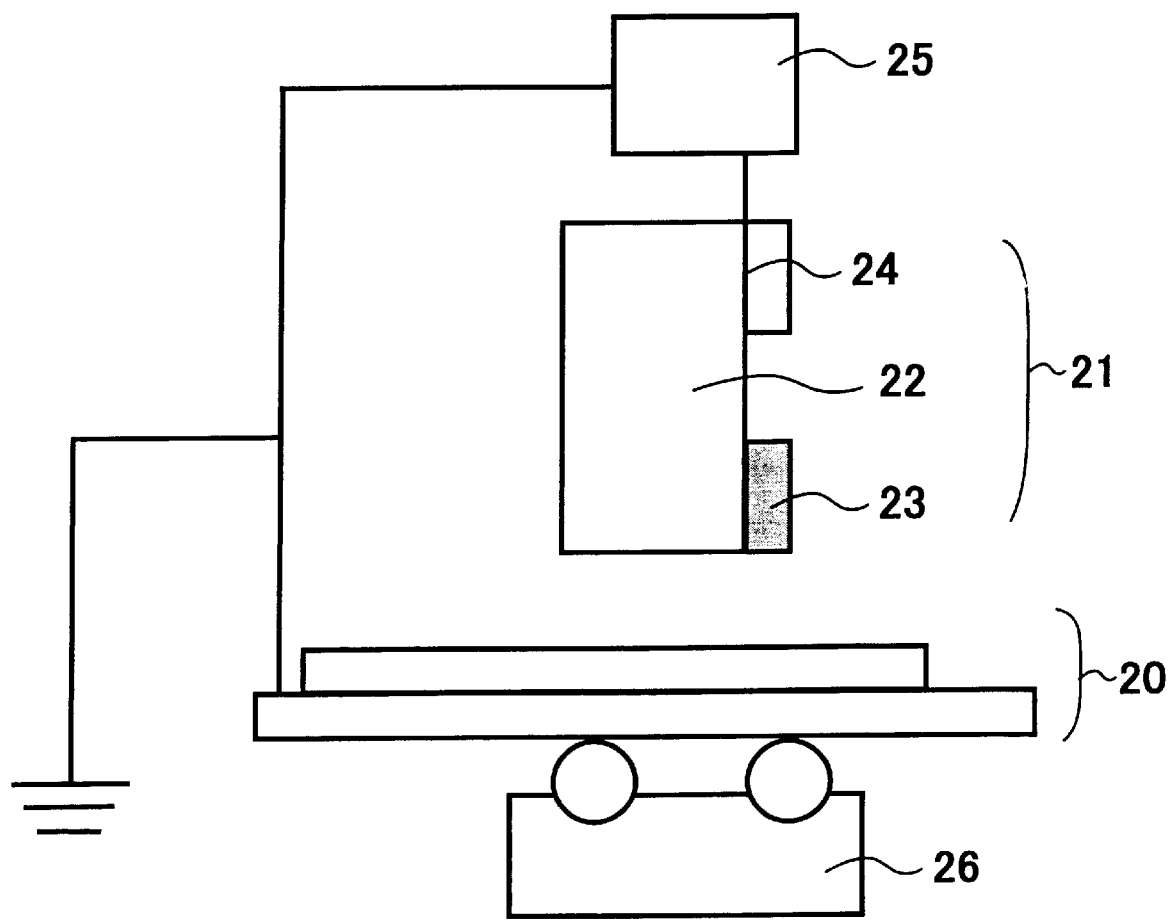
FIG. 9 is a schematic diagram illustrating an embodiment of the electrophoretic display device of the present invention.

FIG. 9 is a schematic view illustrating an embodiment of the display device of the present invention. In FIG. 9, numerals 20, 21, 22, 23, 24, 25 and 26 denote a display medium, an electrode array, a writing board, an electrode, a switching circuit, an electric source and a feeding device, respectively. A voltage is applied by the electrode 23 to the display medium 20 while the medium 20 is fed by the feeding device 26 in the horizontal direction. Thus, an imagewise electric field is formed on the display medium 20, and thereby an image is formed in the display medium 20.

Figure 10:
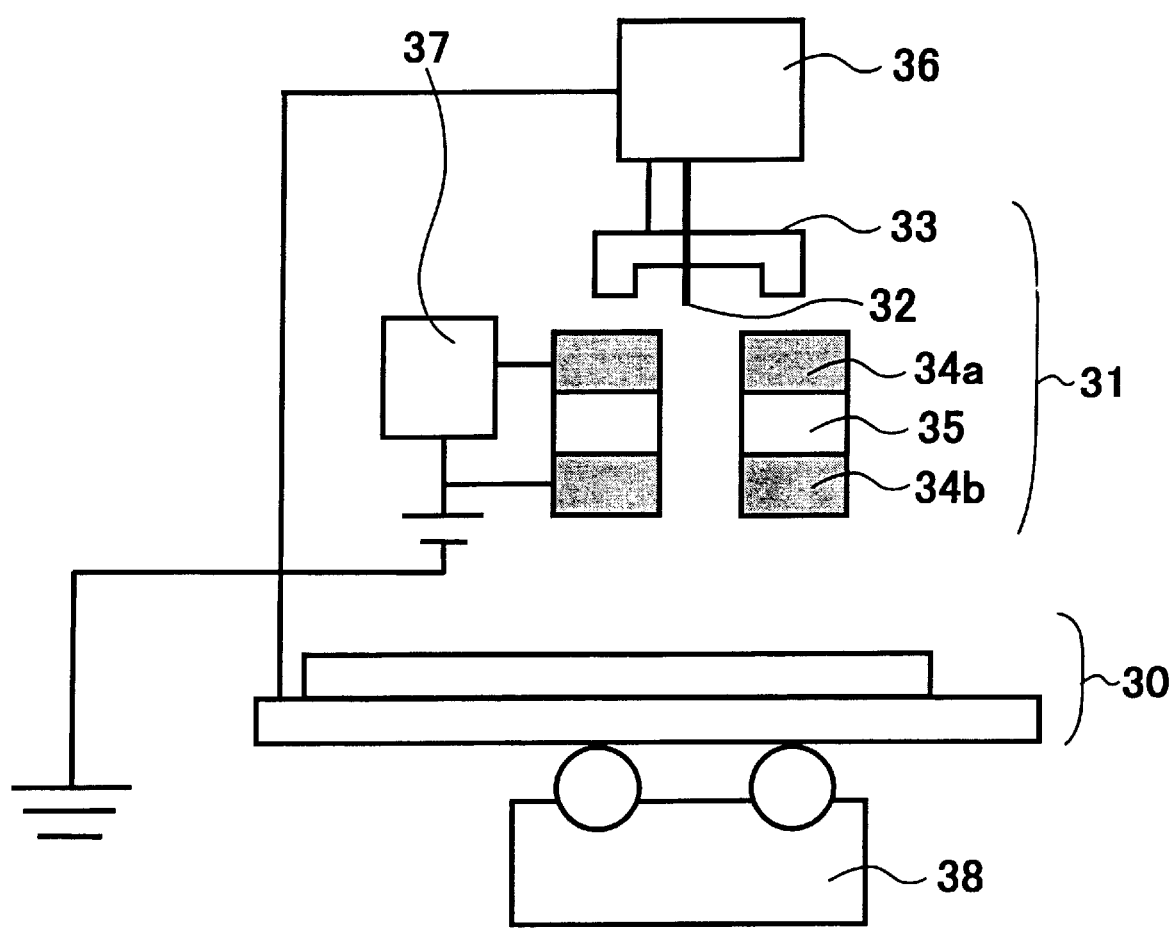
FIG. 10 is a schematic diagram illustrating another embodiment of the electrophoretic display device of the present invention.

FIG. 10 is a schematic view illustrating another embodiment of the display device of the present invention. In FIG. 10, numerals 30, 31, 32, 33, 34a and 34b, 35, 36, 37 and 38 denote a display medium, an ion gun array, a corona wire, a discharge frame, control electrodes, an aperture, a high power source for generating corona ions, a source for controlling ion flow, and a feeding device, respectively. Corona ions projected from the ion gun array 31 and controlled by the controlling electrodes 34a and 34b irradiate the display medium 30, resulting in formation of an imagewise electric field on the display medium 30. Thus, an image is formed in the display medium 30.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Method-1 for Preparing Electrophoretic Display Liquid

Ten (10) Grams of Surfactant (hydroxyfatty acid oligomer, tradenamed as WS-100, manufactured by Asahi Denka Kogyo K.K.) were added into 100 ml of a dispersion medium (phenylxylyl ethane, tradenamed as Hisol SAS-296 manufactured by Nippon Oil Co., Ltd.) to dissolve the surfactant in the dispersion medium. Then 10 g of hollow particles (hereinafter referred to as particle-1) were added into the solution. The particle-1 was dispersed using a ball mill including zirconia beads to prepare a dispersion of the particle-1. Further, 2 g of pigment particles having a color different from the color of the particle-1 (hereinafter referred to as particle-2) were added into the dispersion, and then the mixture was dispersed using the ball mill. Thus, an electrophoretic display liquid was prepared.

Method-2 for Preparing Electrophoretic Display Medium (A) Using the Display Liquid A transparent electroconductive layer (ITO layer) was formed on one side of each of two glass plates having a thickness of 3 mm. The glass plates is opposed such that the electroconductive layers face each other and the distance between the plates was about 140 $\mu$m to form a cell. The display liquid prepared by method-1 was contained in the cell, and then the cell was sealed with an epoxy adhesive. Thus an electrophoretic display medium (A) was prepared.

Method-3 for Preparing Electrophoretic Display Particles (Microcapsule Particles)

An aqueous solution of gelatin and an aqueous solution of gum arabic were mixed. The mixture was heated to 50° C., and then an aqueous solution of sodium hydroxide was added to the mixture to control pH of the mixture so as to be 9. The display liquid prepared by method-1 was added into the mixture, and then the mixture was stirred to prepare an emulsion. The pH of the emulsion was gradually decreased to 4 to form a concentrated liquid of gelatin and gum arabic at the interfaces between the display liquid particles and the gelatin/gum arabic solution. The emulsion was cooled to form a gel film of gelatin and gum arabic around the display liquid particles. Then an aqueous solution of glutaric aldehyde was added into the emulsion to crosslink the film. Thus a slurry of microcapsule particles having a shell of gelatin was prepared. The emulsion conditions were controlled so that the particle diameter of the microcapsule particles was about 50 $\mu$m.

Method-4 for Preparing Electrophoretic Display Medium (B) Using the Microcapsule Particles Twenty (20) grams of the microcapsule particles prepared by method-3 were added into 80 g of a 10% aqueous solution of polyvinyl alcohol to prepare a dispersion. This dispersion (i.e., a coating liquid) was coated on an electroconductive layer (an ITO layer) formed on a polycarbonate plate using an applicator having a gap of 250 $\mu$m, and then dried. Thus, an electrophoretic display medium (B) having a layer including microcapsule particles was prepared. In this display medium, the polyvinyl alcohol serves as a matrix material.

Method-5 for Measuring Reflectance and Contrast of Displayed Image

A DC voltage was applied to each of the display media (A) and (B) using a DC power source. By changing the direction of the electric field, each of the display media (A) and (B) could alternately display the colors (color 1 and color 2) of the hollow particles (particle-1) and the pigment particles (particle-2). When a voltage was applied to display medium (B), the electrode is brought into contact with the surface of the display medium (B).

The reflectance of the colored areas was measured with Photal MCPD-1000 manufactured by Otsuka Electronics Co., Ltd. Light was radiated such that the incident angle was 45°, and the reflected light was received such that the angle of reflection was 0°. The reflectance of the color areas was determined as the reflectance of a standard white plate is 100%. The contrast was determined as follows:

Contrast=(reflectance of color 1)/(reflectance of color 2).

In this case, it is noted that the reflectance of color 1 is higher than the reflectance of color 2.

Example A

Example A1

In method-1, porous spherical silica particles B-6C manufactured by Suzuki Yushi Kogyo Co., Ltd., whose surface was treated with a resin, and magnetite (tri-iron tetraoxide, manufactured by Wako Pure Chemical Industries, Ltd.) were used as the particle-1 and particle-2, respectively. Thus, a display liquid A1 was prepared.

Then an electrophoretic display medium A1 was prepared by the method-2 using the display liquid A1. The contrast of the display medium A1, which was measured by method-5, was 5.0.

Example A2

In method-1, crosslinked-styrene-acrylic hollow particles (SX866A manufactured by Japan Synthetic Rubber Co., Ltd., which has a primary particle diameter of 0.3 $\mu$m and is manufactured by spray drying method), and magnetite (tri-iron tetraoxide, manufactured by Wako Pure Chemical Industries, Ltd.) were used as the particle-1 and particle-2, respectively. Thus, a display liquid A2 was prepared.

Then an electrophoretic display medium A2 was prepared by the method-2 using the display liquid A2. The contrast of the display medium A2, which was measured by method-5, was 5.8.

Example A3

In method-1, crosslinked-styrene-acrylic hollow particles (SX866A manufactured by Japan Synthetic Rubber Co., Ltd., which has a primary particle diameter of 0.3 $\mu$m and is manufactured by spray drying method), and black titanium oxide (titanium black, tradenamed as Tilack D manufactured by Ako Kasei Co., Ltd., whose primary particle diameter is 0.03 $\mu$m and whose surface is not treated) were used as the particle-1 and particle-2, respectively. Thus, a display liquid A3 was prepared.

Then an electrophoretic display medium A3 was prepared by the method-2 using the display liquid A3. The contrast of the display medium A3, which was measured by method-5, was 9.0.

Example A4

In method-1, crosslinked-styrene-acrylic hollow particles (SX866A manufactured by Japan Synthetic Rubber Co., Ltd., which has a primary particle diameter of 0.3 $\mu$m and is manufactured by spray drying method), and black titanium oxide (titanium black, tradenamed as silicone-treated Tilack D manufactured by Ako Kasei Co., Ltd., whose primary particle diameter is 0.03 $\mu$m and whose surface is treated with a silane coupling agent) were used as the particle-1 and particle-2, respectively. Thus, a display liquid A4 was prepared.

Then an electrophoretic display medium A4 was prepared by the method-2 using the display liquid A4. The contrast of the display medium A4, which was measured by method-5, was 10.8.

Example A5

In method-1, crosslinked-styrene-acrylic hollow particles (SX866A manufactured by Japan Synthetic Rubber Co., Ltd., which has a primary particle diameter of 0.3 $\mu$m and is manufactured by spray drying method), and black titanium oxide (titanium black, tradenamed as titanate-treated Tilack D manufactured by Ako Kasei Co., Ltd., whose primary particle diameter is 0.03 $\mu$m and whose surface is treated with a titanate coupling agent) were used as the particle-1 and particle-2, respectively. Thus, a display liquid A5 was prepared.

Then an electrophoretic display medium A5 was prepared by the method-2 using the display liquid A5. The contrast of the display medium A5, which was measured by method-5, was 13.6.

Example A6

The procedure for preparation of the electrophoretic display liquid in method-1 was repeated except that the particle-1 and particle-2 were replaced with porous silica spherical particles (tradenamed as B-6C, manufactured by Suzuki Yushi Kogyo Co., Ltd., whose surface is treated with a resin), and black titanium oxide (titanium black, tradenamed as titanate-treated Tilack D manufactured by Ako Kasei Co., Ltd., whose primary particle diameter is 0.03 μm and whose surface is treated with a titanate coupling agent) were used as the particle-1 and particle-2, respectively. Thus, a display liquid A6 was prepared.

Then an electrophoretic display medium A6 was prepared by the method-2 using the display liquid A6. The contrast of the display medium A6, which was measured by method-5, was 6.0.

EXAMPLE B

Examples B1–B6

In method-3, the display liquid A1, A2, A3, A4, A5 or A6 was used as the display liquid. Thus, microcapsule particles B1, B2, B3, B4, B5 and B6 were prepared.

Then electrophoretic display media B1, B2, B3, B4, B5 and B6 were prepared by method-4 using the microcapsule particles B1, B2, B3, B4, B5 and B6, respectively.

The contrast of the display media, which was measured by method-5, was as follows:

Display media B1: 4.2
Display media B2: 5.0
Display media B3: 7.2
Display media B4: 8.1
Display media B5: 9.5
Display media B2: 5.1.

Comparative Example A'

Comparative Example A1'

In method-1, spherical particles of a crosslinked melamine resin (tradenamed as EPOSTAR S6, manufactured by Nippon Shokubai Co., Ltd., whose particle diameter is 0.6 μm), and black titanium oxide (titanium black, tradenamed as titanate-treated Tilack D manufactured by Ako Kasei Co., Ltd., whose primary particle diameter is 0.03 μm and whose surface is treated with a titanate coupling agent) were used as the pigment-1 and pigment-2, respectively. Thus, a display liquid A1' was prepared.

Then an electrophoretic display medium A1' was prepared by the method-2 using the display liquid A1'. The contrast of the display medium A1', which was measured by method-5, was 1.1.

Comparative Example A2'

In a dispersion medium (dodecyl benzene, manufactured by Tokyo Kasei Co., Ltd., soft type (mixture of linear chain isomers)) of 100 ml, 5 g of a surfactant (oleic acid) and 0.65 g of a blue dye (Macrolex Blue RR, manufactured by Bayer Ltd.) were dissolved. Then 15 g of titanium oxide (tradenamed as CR-50-2, manufactured by Ishihara Sangyo Kaisha Ltd.) were added into the solution and dispersed using a ball mill including zirconia beads. Thus, a display liquid A2' was prepared.

A display medium A2' was prepared by method-2 using the display liquid A2'. When the contrast was measured by method-5, the contrast of the display liquid A2' was 2.0.

Comparative Examples B1' and B2'

In method-3, the display liquid A1' or A2' were used as the display liquid. Thus, microcapsule particles B1' and B2' were prepared.

Then electrophoretic display media B1' and B2' were prepared by method-4 using the microcapsule particles B1' and B2', respectively.

The contrast of the display media, which was measured by method-5, was as follows:

Display medium B1': 1.0
Display medium B2': 1.2.

As can be understood from the above description, the electrophoretic display liquid, and display particles of the present invention can display images having high contrast. In addition, the electrophoretic display material and display device of the present invention, which use the display liquid or display particles, can also display images having good contrast.

This document claims priority and contains subject matter related to Japanese Patent Application No. 11-165518, filed on Jun. 11, 1999, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An electrophoretic display liquid comprising a dispersion medium, a first granular material having one or more hollows therein and a color, and a second granular material having a color different from the color of the first granular material.

2. The electrophoretic display liquid according to claim 1, wherein the first granular material comprises hollow particles of an organic polymer.

3. The electrophoretic display liquid according to claim 1, wherein a surface of the second granular material is treated with a coupling agent.

4. The electrophoretic display liquid according to claim 3, wherein the coupling agent comprises a titanate coupling agent.

5. The electrophoretic display liquid according to claim 1, wherein the second granular material comprises black titanium oxide.

6. The electrophoretic display liquid according to claim 1, wherein the display liquid is microencapsulated.

7. An electrophoretic display medium for displaying an image by electrophoresis, comprising:
   a pair of substrates, at least one of said pair of substrates having an electrode on one side thereof, at least one of said pair of substrates being transparent, and said pair of substrates being opposed each other optionally with one or more spacers therebetween to form a cell, wherein the electrode faces the other substrate; and
   an electrophoretic display liquid contained in the cell, wherein said display liquid comprises a dispersion medium, a first granular material having one or more hollows therein and a color, and a second granular material having a color different from the color of the first granular material.

8. The electrophoretic display medium according to claim 7, wherein the display medium further comprises a matrix material contained in the cell, and wherein the display liquid is separated into a plurality of domains in the matrix material.

9. The electrophoretic display medium according to claim 7, wherein the display liquid is microencapsulated.

10. The electrophoretic display medium according to claim 7, wherein the display medium further comprises a print layer on at least one part thereof.

11. The electrophoretic display medium according to claim 10, wherein the display medium further comprises a protective layer which is formed overlying the print layer.

12. The electrophoretic display medium according to claim 7, wherein the display medium comprises an information storage material formed on an area of the display medium other than an image displaying area in which an image is displayed by electrophoresis.

13. The electrophoretic display medium according to claim 12, wherein the information storage material comprises a memory, and wherein the memory is selected from the group consisting of magnetic memories, integrated circuit memories and photo memories.

14. The electrophoretic display medium according to claim 12, wherein the information storage material comprises an information recording portion from which information is read out by light.

15. The electrophoretic display medium according to claim 12, wherein the information comprises at least one of side information of the display medium and position information in the display medium.

16. An electrophoretic display medium for displaying an image by electrophoresis, comprising:
    a substrate having an electrode on one side thereof; and
    a recording layer which is formed overlying the electrode and which comprises an electrophoretic display liquid and a matrix material, said display liquid being separated into a plurality of domains in the matrix material, wherein the display liquid comprises a dispersion medium, a first granular material having one or more hollows therein and a color, and a second granular material having a color different from the color of the first granular material.

17. The electrophoretic display medium according to claim 16, wherein the display medium further comprises an overcoat layer formed overlying the recording layer.

18. The electrophoretic display medium according to claim 17, wherein the overcoat layer comprises a resin crosslinked upon application of at least one of heat and activating rays.

19. The electrophoretic display medium according to claim 16, wherein the display medium further comprises a print layer on at least one part thereof.

20. The electrophoretic display medium according to claim 19, wherein the display medium further comprises a protective layer which is formed overlying the print layer.

21. The electrophoretic display medium according to claim 16, wherein the display medium comprises an information storage material formed on an area of the display medium other than an information displaying area in which an image is displayed by electrophoresis.

22. The electrophoretic display medium according to claim 21, wherein the information storage material comprises a memory, and wherein the memory is selected from the group consisting of magnetic memories, integrated circuit memories and photo memories.

23. The electrophoretic display medium according to claim 21, wherein the information storage material comprises an information recording portion from which information is read out by light.

24. The electrophoretic display medium according to claim 21, wherein the information comprises at least one of side information of the display medium and position information in the display medium.

25. An electrophoretic display device comprising:
    an electrophoretic display medium; and
    a writing device which applies an electric field to the display medium according to image information to form an image in the display medium by electrophoresis, said writing device being attached to and detached from the display medium, and said writing device having an electric field forming device which changes its position along the display medium when the image is formed,
    wherein said display medium comprises:
        a pair of substrates, at least one of said pair of substrates having an electrode on one side thereof, at least one of said pair of substrates being transparent, and said pair of substrates being opposed each other optionally with one or more spacers therebetween to form a cell, wherein the electrode faces the other substrate; and
        an electrophoretic display liquid contained in the cell, and wherein said display liquid comprises a dispersion medium, a first granular material having one or more hollows therein and a color, and a second granular material having a color different from the color of the first granular material.

26. The electrophoretic display device according to claim 25, wherein the electric field forming device is selected from the group consisting of an electrode array, an ion gun array, and a device comprising a plurality of signal electrodes, a plurality of scanning electrodes, and switching elements which are provided at intersections of the plurality of signal electrodes and the plurality of scanning electrodes.

27. The electrophoretic display device according to claim 26, wherein the electric field forming device is the device comprising a plurality of signal electrodes, a plurality of scanning electrodes, and switching elements which are provided at intersections of the plurality of signal electrodes and the plurality of scanning electrodes, and wherein each switching element comprises a thin film transistor.

28. An electrophoretic display device comprising:
    an electrophoretic display medium; and
    a writing device which applies an electric field to the display medium according to image information to form an image in the display medium by electrophoresis, said writing device being attached to and detached from the display medium, and said writing device having an electric field forming device which changes its position along the display medium when the image is formed,
    wherein said display medium comprises:
        a substrate having an electrode on one side thereof; and
        a recording layer which is formed overlying the electrode and which comprises an electrophoretic display liquid and a matrix material, said display liquid being separated into a plurality of domains in the matrix material, and wherein the display liquid comprises a dispersion medium, a first granular material having one or more hollows therein and a color, and a second granular material having a color different from the color of the first granular material.

29. The electrophoretic display device according to claim 28, wherein the electric field forming device is selected from the group consisting of an electrode array, an ion gun array, and a device comprising a plurality of signal electrodes, a plurality of scanning electrodes, and switching elements which are provided at intersections of the plurality of signal electrodes and the plurality of scanning electrodes.

30. The electrophoretic display device according to claim 29, wherein the electric field forming device is the device comprising a plurality of signal electrodes, a plurality of scanning electrodes, and switching elements which are provided at intersections of the plurality of signal electrodes and the plurality of scanning electrodes, and wherein each switching element comprises a thin film transistor.

31. An electrophoretic displaying method comprising the steps of:
    providing an electrophoretic display medium comprising an electrophoretic display liquid comprising a dispersion medium, a first granular material having one or more hollows therein and a color, and a second granular material having a color different from the color of the first granular material; and imagewise applying an electric field to the display medium to form an image in the display medium by electrophoresis.

32. The electrophoretic displaying method according to claim 31, wherein the method further comprises a step of applying the display medium another electric field opposite to the electric field to erase the image.

33. The electrophoretic displaying method according to claim 31, wherein the method further comprises the steps of:

applying the display medium another electric field opposite to the electric field to erase the image; and repeating the image forming step and the image erasing step.

34. The electrophoretic displaying method according to claim 31, wherein the display liquid is microencapsulated.

35. A reversible image displaying material comprising an electrophoretic display medium comprising an electrophoretic display liquid comprising a dispersion medium, a first granular material having one ore more hollows therein and a color, and a second granular material having a color different from the color of the first granular material.

36. The reversible image displaying material according to claim 35, wherein the reversible image displaying material has flexibility.

37. The reversible image displaying material according to claim 35, wherein the reversible image displaying material is arranged on a device selected from the group consisting of cards, recording sheets, display devices for electric products, and signboards.

* * * * *

UNITED STATES PATENT AND TRADEMARK OFFICE
CERTIFICATE OF CORRECTION

PATENT NO.    : 6,400,492 B1
DATED         : June 4, 2002
INVENTOR(S)   : Morita et al.

It is certified that error appears in the above-identified patent and that said Letters Patent is hereby corrected as shown below:

<u>Title page,</u>
Item [30], the Foreign Application Data is incorrect. Item [30] should read:

-- [30]    Foreign Application Priority Data

Jun. 11, 1999 (JP) ............................. 11-165518
May 15, 2000 (JP) ............................. 2000-141562 --

Signed and Sealed this

Fifth Day of November, 2002

*Attest:*

JAMES E. ROGAN
*Attesting Officer*    *Director of the United States Patent and Trademark Office*